(12) United States Patent
Knorr et al.

(10) Patent No.: US 11,182,974 B2
(45) Date of Patent: Nov. 23, 2021

(54) METHOD AND SYSTEM FOR REPRESENTING A VIRTUAL OBJECT IN A VIEW OF A REAL ENVIRONMENT

(71) Applicant: Apple Inc., Cupertino, CA (US)

(72) Inventors: Sebastian Knorr, Mountain View, CA (US); Peter Meier, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/983,629

(22) Filed: Aug. 3, 2020

(65) Prior Publication Data
US 2020/0364939 A1 Nov. 19, 2020

Related U.S. Application Data

(63) Continuation of application No. 16/571,919, filed on Sep. 16, 2019, now Pat. No. 10,733,804, which is a
(Continued)

(51) Int. Cl.
*G06T 15/50* (2011.01)
*H04N 13/239* (2018.01)
(Continued)

(52) U.S. Cl.
CPC .............. *G06T 19/006* (2013.01); *G06T 7/11* (2017.01); *G06T 15/50* (2013.01); *H04N 13/239* (2018.05);
(Continued)

(58) Field of Classification Search
CPC ......... G06T 19/006; G06T 7/11; G06T 15/50; G06T 2207/30201; G06T 2207/10004; H04N 13/0239
(Continued)

(56) References Cited

U.S. PATENT DOCUMENTS 6,166,744 A 12/2000 Jaszlics
7,176,918 B2 2/2007 Anderson
(Continued)

FOREIGN PATENT DOCUMENTS

CN 106133796 A 11/2016
EP 1347419 A2 9/2003

OTHER PUBLICATIONS

Adelson et al., "The Plenoptic Function and the Elements of Early Vision," Computational Models of Visual Processing, 1991.
(Continued)

*Primary Examiner* — Jae N Noh
(74) *Attorney, Agent, or Firm* — Blank Rome LLP

(57) ABSTRACT

The invention relates to a method of representing a virtual object in a view of a real environment which comprises the steps of providing image information of a first image of at least part of a human face captured by a first camera, providing at least one human face specific characteristic, determining at least part of an image area of the face in the first image as a face region of the first image, determining at least one first light falling on the face according to the face region of the first image and the at least one human face specific characteristic, and blending in the virtual object on a display device in the view of the real environment according to the at least one first light. The invention also relates to a system for representing a virtual object in a view of a real environment.

20 Claims, 13 Drawing Sheets

Related U.S. Application Data continuation of application No. 15/128,418, filed as application No. PCT/EP2014/055938 on Mar. 25, 2014, now Pat. No. 10,417,824.

(51) Int. Cl.
   *G06T 19/00* (2011.01)
   *G06T 7/11* (2017.01)
(52) U.S. Cl.
   CPC ............... *G06T 2207/10004* (2013.01); *G06T 2207/30201* (2013.01)
(58) Field of Classification Search
   USPC .......................................................... 348/47
   See application file for complete search history.

(56) References Cited

U.S. PATENT DOCUMENTS

| | | |
|---|---|---|
| 7,408,550 B2 | 8/2008 | Bunnell |
| 7,663,623 B2 | 2/2010 | Zhou |
| 7,864,176 B2 | 1/2011 | Planck |
| 7,864,198 B2 | 1/2011 | Moroto |
| 7,884,820 B2 | 2/2011 | Zhou |
| 7,948,490 B2 | 5/2011 | Sloan |
| 8,139,059 B2 | 3/2012 | Forrest |
| 8,405,658 B2 | 3/2013 | Kuo |
| 8,633,927 B2 | 1/2014 | Mech |
| 8,797,321 B1 | 8/2014 | Bertolami |
| 8,847,956 B2 | 9/2014 | Belt |
| 8,982,229 B2 | 3/2015 | Suzuki |
| 9,101,832 B2 | 8/2015 | Ito |
| 9,171,399 B2 | 10/2015 | Pappoppula |
| 9,449,427 B1 | 9/2016 | Baldwin |
| 9,466,149 B2 | 10/2016 | Jones |
| 2003/0138134 A1 | 7/2003 | Petrich |
| 2003/0179197 A1 | 9/2003 | Sloan |
| 2004/0201586 A1 | 10/2004 | Marschner |
| 2004/0263510 A1 | 12/2004 | Marschner |
| 2005/0083340 A1 | 4/2005 | Sloan |
| 2005/0088440 A1 | 4/2005 | Sloan |
| 2006/0214931 A1 | 9/2006 | Snyder |
| 2006/0251327 A1 | 11/2006 | Trajkovic |
| 2008/0024523 A1 | 1/2008 | Tomite |
| 2008/0211813 A1 | 9/2008 | Ankit |
| 2008/0309667 A1 | 12/2008 | Zhou |
| 2009/0006044 A1 | 1/2009 | Zhou |
| 2009/0128552 A1 | 5/2009 | Masakazu |
| 2009/0262213 A1 | 10/2009 | Watanabe |
| 2010/0007665 A1 | 1/2010 | Smith |
| 2012/0008854 A1 | 1/2012 | Shim |
| 2012/0027292 A1 | 2/2012 | Kozakaya et al. |
| 2012/0032960 A1 | 2/2012 | Kameyama |
| 2012/0218263 A1 | 8/2012 | Meier |
| 2013/0271625 A1* | 10/2013 | Gruber ................. G06K 9/4661 348/239 |
| 2014/0035959 A1 | 2/2014 | Lapstun |
| 2014/0099031 A1 | 4/2014 | Brandt |
| 2014/0125668 A1 | 5/2014 | Steed |
| 2014/0320530 A1 | 10/2014 | Gruber |
| 2015/0215623 A1 | 7/2015 | Sanders |
| 2015/0262412 A1 | 9/2015 | Gruber |
| 2015/0276591 A1 | 10/2015 | Kubo |

OTHER PUBLICATIONS

Alexander Keller, "Instant Radiosity," SIGGRAPH 1997.
Arief et al., "Realtime Estimation of Illumination Direction for Augmented Reality on Mobile Devices," 20th Color and Imaging Conference Final Program and Proceedings, 2012.
Basri et al., "Lambertian Reflectance and Linear Subspaces," Wiezmann Institute of Science, Technical Report MCS00-21.
Blanz, V., et al., "A Morphable Model for the Synthesis of 3D Faces," SIGGRAPH '99: Proceedings of the 26th Annual Conference on Computer Graphics and Interactive Techniques, Aug. 1999, pp. 187-194.
Calian et al., "The Shading Probe: Fast Appearance Acquisition for Mobile AR," ACM, 2013.
Debevec et al., "Acquiring the Reflectance Field of a Human Face," SIGGRAPH 2000 Conference Proceedings.
Fanelli, Gabriele, et al., "Real time head pose estimation with random regression forests," IEEE Conference on Computer Vision and Pattern Recognition (CVPR), 2011.
Fournier, et al., "Common Illumination between Real and Computer Generated Scenes," Department of Computer Science, University of British Columbia, 1992.
Fuchs et al., "Reflectance from Images: A Model-Based Approach for Human Faces," Mpi Informatik, Jan. 2005.
Georg Klein and David Murray, Simulating Low-Cost Cameras for Augmented Reality Compositing, In Transactions on Visualization and Computer Graphics (TVCG) May/Jun. 2010, (vol. 16 No. 3) pp. 369-380.
Georghiades, Athinodoros, et al., "From few to many: Illumination cone models for face recognition under variable lighting and pose," IEEE Transactions on Pattern Analysis and Machine Intelligence, 23.6 (2001): 643-660.
Gruber, Lukas, et al., "Real-time photometric registration from arbitrary geometry," IEEE International Symposium on Mixed and Augmented Reality (ISMAR), 2012.
Hyunjung Shim et al., "A Subspace Model-Based Approach to Face Relighting Under Unknown Lighting and Poses," IEEE Transactions on Image Processing, IEEE Service Center, Piscataway, NJ, US, vol. 17, No. 8, Aug. 2008 (Aug. 2008), pp. 1331-1341, XP011247525, ISSN: 1057-7149.
Jachnik et al., "Real-Time Surface Light-Field Capture for Augmentation of Planar Specular Surfaces," IEEE International Symposium on Mixed and Augmented Reality, 2012.
James Kajiya, "The Rendering Equation," SIGGRAPH 1986.
Kan, Peter, and Hannes Kaufmann, "High-quality reflections, refractions, and caustics in augmented reality and their contribution to visual coherence," IEEE International Symposium on Mixed and Augmented Reality (ISMAR), 2012.
Kanbara et al., "Real-Time Estimation of Light Source Environment for Photorealistic Augmented Reality," Graduate School of Information Science, 2004.
Knecht et al., "Reciprocal Shading for Mixed Reality," Computer & Graphics, Oct. 18, 2012.
Knecht, Martin, et al., "Differential instant radiosity for mixed reality," 9th IEEE International Symposium on Mixed and Augmented Reality (ISMAR), 2010.
Knorr, Sebastian B. et al., "Real-time illumination estimation from faces for coherent rendering," 2014 IEEE International Symposium on Mixed and Augmented Reality (ISMAR), IEEE, Sep. 10, 2014 (Sep. 10, 2014), pp. 113-122, XP032676155, DOI: 10.1109/ISMAR.2014.6948416.
Koc Emre et al., "Estimation of Environmental Lighting from Known Geometries for Mobile Augmented Reality," 2013 International Conference on Cyberwolds, IEEE, Oct. 21, 2013 (Oct. 21, 2013), pp. 132-139, XP032529462, DOI: 10.1109/CW.2013.65.
Kuang-Chih Lee et al., "A Practical Face Relighting Method for Directional Lighting Normalization," 2005, Analysis and Modelling of Faces and Gestures Lecture Notes in Computer Science, LNCS, Springer, Berlin, DE, pp. 155-169, XP019021347, ISBN: 978-3-540-29229-6.
Lee, Kuang-Chih, et al., "Acquiring linear sub-spaces for face recognition under variable lighting," IEEE Transactions on Pattern Analysis and Machine Intelligence, 27.5 (2005): 684-698.
Liu et al., "All-Frequency Precomputed Radiance Transfer for Glossy Objects," Eurographics Symposium on Rendering, 2004.
Marschner et al., "Inverse Lighting for Photography," IS&T Fifth Color Imaging Conference, Nov. 1997.
Meilland, et al., "3D High Dynamic Range Dense Visual SLAM and its Application to Real-Time Object Relighting," IEEE International Symposium on Mixed and Augmented Reality 2013 Science and Technology Proceedings, Oct. 1-4, 2013.
Miika Aittala, "Inverse lighting and photorealistic rendering for augmented reality," The Visual Computer, International Journal of

(56) References Cited

OTHER PUBLICATIONS

Computer Graphics, Springer, Berlin, DE, vol. 26, No. 6-8, Apr. 14, 2010 (Apr. 14, 2010), pp. 669-678, XP019845871, ISSN: 1432-2315.
Nakamae, et al., A Montage Method: The Overlaying of the Computer Generated Images Onto a Background Photograph, vol. 20, No. 4, 1986.
Nicodemus et al., "Geometrical Considerations and Nomenclature for Reflectance," Institute for Basic Standards, Oct. 1997.
Nishino, Ko, et al., "Using eye reflections for face recognition under varying illumination," Tenth IEEE International Conference on Computer Vision (ICCV), vol. 1, 2005.
P. Debevec, "Rendering synthetic objects into real scenes: bridging traditional and image-based graphics with global illumination and high dynamic range photography," In Proceedings of the 25th annual conference on Computer graphics and interactive techniques, SIGGRAPH '98, pp. 189-198, New York, NY, USA, 1998, ACM.
Peter-Pike Sloan, "Stupid Spherical Harmonics (SH) Tricks," GDC 2008.
Qing et al., "Eigen-Harmonics Faces: Face Recognition Under Generic Lighting," Proceedings of the Sixth IEEE International Conference on Automatic Face and Gesture Recognition, 2004.
Ramamoorthi et al., "A Signal-Processing Framework for Inverse Rendering," ACM Siggraph, Aug. 12-17, 2001.
Ravi Ramamoorthi, "Analytic PCA Construction for Theoretical Analysis of Lighting Variability in Images of a Lambertian Object," IEEE Transactions on Pattern Analysis and Machine Intelligence, vol. 24, No. 10, Oct. 2002.
Ravi Ramamoorthi, "Modeling Illumination Variation with Spherical Harmonics," Berkley, 2006.
Robin Green, "Spherical Harmonic Lighting: The Gritty Details," Spherical Harmonic Lighting, Jan. 16, 2003.
Sato, I., et al., "Acquiring a radiance distribution to superimpose virtual objects onto a real scene," IEEE Transactions on Visualization and Computer Graphics 5, 1 (Jan.-Mar. 1999).
Sim et al., "Illuminating the Face," CMU-RI-TR-01-31, Sep. 28, 2001.
Suh, Sungho, et al., "Robust Albedo Estimation From a Facial Image With Case Shadow Under General Unknown Lighting," IEEE Transactions on Image Processing, 22.1 (2013): 391-401.
Yang Wang et al., "Estimation of multiple directional light sources for synthesis of mixed reality images," 10th Pacific Conference on Computer Graphics and Applications, 2002, Proceedings, Beijing, China Oct. 9-11, 2002, Los Alamitos, CA, USA, IEEE Comput. Soc. US, Oct. 9, 2002 (Oct. 9, 2002), pp. 38-47, XP010624887, DOI: 10.1109/PCCGA.2002.1167837, ISBN: 978-0-7695-1784-1.
Yang, et al., "Face relighting from a single image under arbitrary unknown lighting conditions," IEEE Transactions on Pattern Analysis and Machine Intelligence, 31.11 (2009): 1968-1984.
Yang, Ruigang, and Zhengyou Zhang, "Model-based head pose tracking with stereovision," Fifth IEEE International Conference on Automatic Face and Gesture Recognition, 2002.
Yao, Y., Kawamura, H., & Kojima, A., "The Hand as a Shading Probe," ACM SIGGRAPH 2013 Posters, 2013, 108.
Zhang et al., "Face Synthesis and Recognition from a Single Image Under Arbitrary Unknown Lighting Using a Spherical Harmonic Basis Morphable Model," Computer Vision and Pattern Recognition, 2005.
Zhang, Lei, and Dimitris Samaras, "Face recognition under variable lighting using harmonic image exemplars," IEEE Computer Society Conference on Computer Vision and Pattern Recognition, Proceedings, vol. 1, 2003.
Balan, et al., "Shining a Light on Human Pose: On Shadows, Shading and the Estimation of Pose and Shape," 2007 EEE 11th International Conference on Computer Vision.
Hyunjung Shim, "Faces as light probes for relighting," Opt. Eng. 51(7) 077002 (Jul. 5, 2012).

* cited by examiner

METHOD AND SYSTEM FOR REPRESENTING A VIRTUAL OBJECT IN A VIEW OF A REAL ENVIRONMENT

The present disclosure is related to a method and system for representing a virtual object in a view of a real environment.

BACKGROUND

In Augmented Reality (AR), a view of a real environment, such as a video image of the real environment, is combined with an overlay of one or more virtual objects in a spatial relationship to the real environment. For many AR applications, the virtual objects shall seamlessly integrate in the view so that real and virtual objects cannot be distinguished. Therefore, it is important to illuminate or display the virtual objects with the same lighting conditions visible in the real world as well as let the virtual objects change the illumination for example by casting shadows onto parts from the real scene. For augmented reality scenes, the lighting conditions are typically unknown and arbitrary, and therefore it is generally difficult or even impossible to have consistent lighting for the real and virtual objects.

A possible way to have consistent lighting for the real and virtual objects in AR applications is to estimate light emitted from the real environment. Common approaches in state of the art require additional setups, e.g. mirrors, or special cameras, e.g. fish eye camera, in order to estimate environment light. This definitely restricts applicability of these approaches. Further, most of the common approaches could only estimate directions of environment light, but not positions of any light source.

An approach of estimating or capturing environment light is to create a panoramic image of the real environment by an omni-camera (like described in Sato, I., et al., "Acquiring a radiance distribution to superimpose virtual objects onto a real scene," IEEE Transactions on Visualization and Computer Graphics 5.1 (January-March 1999) ("Sato")) or by capturing an image of a mirror sphere (like described in Debevec). The environment light could be directly measured according to the panoramic image. One problem of this approach is the necessity of additional setup, which, e.g., either requires a fish-eye camera lens or the mirror sphere, wherein the extra objects added to the scene change the original scene. Further, this approach measures directions of the environment light.

Another approach of estimating environment light is based on an image of the real environment and a known model of the real environment. For example, in Gruber, Lukas, et al., "Real-time photometric registration from arbitrary geometry," IEEE International Symposium on Mixed and Augmented Reality (ISMAR), 2012 ("Gruber") propose to use a RGB-D camera to capture a depth image of the real environment and then reconstruct a surface of the real environment. The environment light could be estimated from the surface information based on the depth data and texture information from the RGB data from the RGB-D camera.

Therefore, it would be desirable to provide a method of representing a virtual object in a view of a real environment which is capable of enhancing applicability of an augmented reality application, particularly in environments with unknown lighting conditions.

SUMMARY

According to an aspect, there is disclosed a method of representing a virtual object in a view of a real environment, comprising providing image information of a first image of at least part of a human face captured by a first camera, providing at least one human face specific characteristic, determining at least part of an image area of the face in the first image as a face region of the first image, determining at least one first light falling on the face according to the face region of the first image and the at least one human face specific characteristic, and blending in the virtual object on a display device in the view of the real environment according to the at least one first light.

According to another aspect, there is disclosed a system for representing a virtual object in a view of a real environment, comprising a processing system which is configured to receive image information of a first image of at least part of a human face captured by a first camera, to provide at least one human face specific characteristic, to determine at least part of an image area of the face in the first image as a face region of the first image, to determine at least one first light falling on the face according to the face region of the first image and the at least one human face specific characteristic, and to communicate with a display device to blend in the virtual object on the display device in the view of the real environment according to the at least one first light.

For example, the processing system is comprised in a mobile device (such as a mobile phone, tablet computer, or mobile computer, often called laptop) and/or in a server computer adapted to communicate with the mobile device. The processing system may be comprised in only one of these devices, e.g. in the mobile device or in the server computer, or may be a distributed system in which one or more processing tasks are distributed and processed by one or more components which are distributed and are communicating with each other, e.g. by point to point communication or via a network.

According to an embodiment, the first camera is associated with the display device such that the at least part of the human face is captured by the first camera when the human face is facing the display device.

According to an embodiment, the system comprises a mobile device which comprises the first camera and the display device, wherein a normal of the display device and an optical axis of the first camera are oriented in substantially the same direction. Substantially the same direction shall mean that small deviations in orientation angle, such as up to 5-10°, shall be en-compassed.

According to embodiments of the present invention, there is proposed to use the face of a user, who experiences AR applications and is already present in the real environment, to estimate the environment light (i.e. light emitted from the environment). This has various ad-vantages. The face of the user is available, so no extra geometry has to be added and no tedious setup is required. A human face is limited in range of variation in geometry and material and thereby allows some kind of preprocessing as well as optimized algorithms based on valid assumptions and restrictions which can run faster and more efficiently. As the face of the user is always available as long as the user is facing or looking at the augmented view of the real environment, dynamically changing illumination can be supported. In use cases where, for example, virtual objects are human wearable objects or clothes, the face of the user is close to the location of the augmentation, which is another benefit.

Illumination from human faces may be estimated in the area of face recognition under variable illumination in order to subtract the influence of the illumination and to retrieve illumination free images for a better recognition of facial features, like described in Lee, Kuang-Chih, et al., "Acquiring linear sub-spaces for face recognition under variable lighting," IEEE Transactions on Pattern Analysis and Machine Intelligence, 27.5 (2005): 684-698 ("Lee") and Georghiades, Athinodoros, et al., "From few to many: Illumination cone models for face recognition under variable lighting and pose," IEEE Transactions on Pattern Analysis and Machine Intelligence, 23.6 (2001): 643-660 ("Athinodoros"). Here, illumination is a disturbing factor which shall be removed.

The illumination of faces may be estimated and changed to another illumination in the area of face relighting, like described in Yang, et al., "Face relighting from a single image under arbitrary unknown lighting conditions," IEEE Transactions on Pattern Analysis and Machine Intelligence, 31.11 (2009): 1968-1984. Focus lies on adapting the appearance of faces themselves, not to use recovered light to illuminate additional objects consistently.

According to an embodiment, the determined at least one first light is relative to the first camera when the first camera captures the first image.

According to an embodiment, the at least one human face specific characteristic comprises, but is not limited to, at least one of the following: a generic 3D face model, a geometry of at least part of a face, a material property of at least part of a face, a color of at least part of a face, a radiance transfer property of at least part of a face, a reflection property of at least part of a face, and a suitability rating of at least part of a face for usage in light estimation.

According to an embodiment, determining the at least one first light comprises determining at least one characteristic of the at least one first light, wherein the at least one characteristic of the at least one first light comprises at least one of intensity, wavelength, and direction.

According to an embodiment, determining the at least one first light comprises determining at least one characteristic of at least one light source emitting or reflecting or refracting at least part of the at least one first light, wherein the at least one characteristic of the at least one light source comprises at least one of the following: type, intensity, wavelength, direction, distance, position, dimension, area, shape, spherical harmonics coefficient, wavelet basis coefficients, and coefficients of mixtures of von Mises-Fisher distributions, particularly at least one of number of modes, mean direction and concentration parameters.

For example, the at least one light source comprises at least one of the following: ambient light, point light, directional light, spot light, area light source, and environmental light, wherein the environmental light is represented as environment map, spherical harmonics, wavelets, or mixtures of von Mises-Fisher distributions.

According to an embodiment, the view of the real environment is captured as an image by the first camera, and the blending in the virtual object comprises illuminating at least part of the virtual object according to the determined at least one first light.

According to an embodiment, the view of the real environment is captured as an image by a second camera, wherein the second camera has a known spatial relationship to the first camera, and the blending in the virtual object comprises illuminating at least part of the virtual object according to the determined at least one first light and the known spatial relationship between the first camera and second camera.

For example, the blending in the virtual object comprises providing a pose of the second camera relative to the real environment when the second camera captures the view of the real environment, and aligning the virtual object with the view of the real environment according to the provided pose. According to an embodiment, the blending in the virtual object comprises providing a pose of the first camera relative to the face or to the real environment when the first camera captures the view of the real environment, and aligning the virtual object with the view of the real environment according to the provided pose.

According to an embodiment, the determining the at least one first light comprises providing depth information associated with the face region of the first image, and determining the at least one first light according to intensity and the depth information associated with the face region of the first image.

According to an embodiment, the determining the at least one first light comprises providing at least part of a 3D face model, wherein the 3D face model is a generic 3D face model or a 3D model of a face, providing a pose of the face relative to the first camera when the first camera captures the first image, and determining the at least one first light according to intensity information associated with the face region and the at least part of the 3D face model.

According to an embodiment, the determining the at least one first light comprises providing image information of a plurality of images of human faces in a plurality of different illuminations and poses, wherein the plurality of different illuminations and poses are known, providing a plurality of face sample positions, determining, for each of the plurality of images, image positions of at least part of the face sample positions, determining, for each of the plurality of face sample positions, a radiance transfer function according to intensity information associated with the image positions in at least part of the plurality of images and the illuminations and poses associated with the at least part of the plurality of images, determining image positions of at least part of the face sample positions in the first image, and determining the at least one first light according to intensity information associated with the image positions of at least part of the face sample positions in the first image and the radiance transfer functions associated with the at least part of the face sample positions in the first image.

According to an embodiment, the face region is determined according to a thermal image of at least part of the face, wherein at least part of the thermal image is aligned with at least part of the first image.

According to an embodiment, the face region includes at least one face portion, which comprises at least one of the following: nose, cheek, forehead, jaw, eye, and chin.

According to an embodiment, the method further comprises determining at least part of a non-face image area in the first image as a background region, determining at least one second light according to the background region in a way different from determining the at least one first light, and updating the determined at least one first light by combining the determined at least one first light and the determined at least one second light.

According to an embodiment, the method further comprises providing image information of a second image of at least part of the real environment captured by a second camera, wherein the second camera has a known spatial relationship to the first camera, determining at least one third light according to the second image, and updating the determined at least one first light by combining the determined at least one first light and the determined at least one third light according to the known spatial relationship.

According to an embodiment, the method further comprises providing image information of multiple images of the face in different poses relative to at least a part of the real environment and computing at least one of a range of lights and a position of a light source according to the multiple images.

According to an embodiment, the method further comprises determining a first pose of the face relative to the first camera when the first camera captures the first image, providing image information of a third image of at least part of the face captured by the first camera, determining at least one fourth light according to the third image, determining a third pose of the face relative to the first camera when the first camera captures the third image, and updating the determined at least one first light by combining the determined at least one first light and the determined at least one fourth light according to the first pose and the third pose.

According to an embodiment, the method further comprises providing image information of a third image of at least part of the face captured by the first camera, determining at least one fourth light according to the third image, determining a motion between when the first camera is capturing the first image and the third image in a real environment coordinate system associated with at least part of the real environment, and updating the determined at least one first light by combining the determined at least one first light and the determined at least one fourth light according to the motion.

According to an embodiment, the method further comprises updating the determined at least one first light by combining the determined at least one first light and the determined at least one fourth light according to the first pose, the third pose and the motion.

For example, the motion may be determined according to at least one tracking sensor, particularly at least one of an inertial sensor, GPS sensor, and compass. The motion may also be determined according to non-face areas of the first and third images. The motion may also be determined according to at least one image of at least part of the real environment captured by a second camera, wherein the second camera has a known spatial relationship to the first camera or is rigidly fixed relative to the first camera.

According to an embodiment, the method further comprises providing a common coordinate system associated with the first image and third image, wherein the common coordinate system is one of the real environment coordinate system, a coordinate system associated with the face and a coordinate system associated with the first camera.

For instance, the combining the determined at least one first light and the determined at least one fourth light comprises determining a direction of the at least one first light and a direction of the at least one fourth light, and determining an intersection between lines along the two determined directions.

According to another embodiment, the combining the determined at least one first light and the determined at least one fourth light comprises computing a value of a characteristic of the updated at least one first light according to a value of the characteristic of the at least one first light and a value of the characteristic of the at least one fourth light based on a mathematic method, particularly at least one of averaging, least squares minimization, ransac, and probability maximization.

According to an embodiment, the blending in the virtual object comprises changing an illumination of at least part of the view of the real environment according to the virtual object and the at least one first light. For example, the changing the illumination is made according to differential rendering.

According to an embodiment of the invention, environment light is estimated based on an image of a human face and then the estimated light is applied to illuminate a virtual object that is blended in in a view of a real environment. Particularly, the current invention discloses to use a modern mobile device (e.g. mobile phone or tablet computer) equipped with a display screen and one or two cameras (e.g., a front camera looking at the same side as the screen and a back camera looking at an opposite side as the screen). Since the user looks at the screen in order to experience AR images, the front camera can always capture the face of the user, while the back camera could capture the view of the real environment.

According to an embodiment of the invention, there is determined at least one light emitted from the real environment. The light emitted from the real environment is environment light and also called illumination or real illumination.

According to the current disclosed invention, one significant difference from prior art for determining real illumination for consistent lighting of real and virtual content is the explicit use of one or more human face specific characteristics of the face of a user under illumination captured by a user facing camera (i.e. a camera pointing to the user or pointing to an image of the user reflected by one or more optical instruments, e.g. mirrors or optic lens, for capturing the user's face) when the user is observing the visual content of the augmented scene on the display device. This allows the application of a-priori knowledge about human faces. The image is typically captured by a user facing camera and is used for estimating the illumination instead of relying on additional objects of known geometry in the scene for a light probe or using arbitrary scene geometry which can be randomly inappropriate for estimating the illumination from it. By explicitly using the face (e.g. using face specific characteristics), which is mostly or always available over the whole duration of the user observing the augmentation, the illumination can be estimated at any time without taking influence on the scene. Additionally by explicitly focusing on the face, which has a limited range of variation in terms of geometry and material between all humans, specialized algorithms for estimating the light from the face of the user can be applied. Assumptions that would be invalid for arbitrary scene surfaces can be applied like a specific model for skin reflectance which reduces the physical problem of ambiguity between surface reflectance and light intensity/color. Regions of the face particularly suited for estimating the illumination can be pre-learned and/or pre-defined and distinguished from other regions. These regions can be registered in live tracking via established algorithms of face detections and pose detections. Regions that could have a bad impact on the estimation can be taken into account (like brows).

Also for many use cases a limited variation in distance between the user's face and the user facing camera can be assumed, for example with the user being close to the device because he is holding the device or because the user is next to the display device to experience the AR application and thereby also near the user facing camera. This limited distance makes the scenario more robust for applying depth cameras that exhibit a limited depth/precision range compared to the scene in front of the user, which can be far away (like the next house).

Additionally the invention may not require any offline pre-process of capturing a light probe—an omni-directional (360° panoramic) high-dynamic range image which captures measurements of the incident illumination for all directions—beforehand and supports dynamically changing illumination, because the face of the user may be tracked over the whole period during which the user is watching the AR scenario.

Compared with state of the art using special objects like a ping pong ball or a planar marker, like used in Miika Aittala, "Inverse lighting and photorealistic rendering for augmented reality," The Visual Computer, International Journal Of Computer Graphics, Springer, Berlin, DE, vol. 26, no. 6-8, 14 Apr. 2010 (2010-04-14), pages 669-678, XP019845871, ISSN: 1432-2315, that have to be placed explicitly in the room and captured by a camera for the light estimation, the face of the user has the great advantage that one need not pay special attention to keep the object within the field of view of the camera during the whole process of augmentation.

Setup with One Camera:

One embodiment of the invention is using environment light estimated from an image of the face of the user captured by a camera for rendering augmentations with consistent illumination between real and virtual objects within an image captured by the camera. The camera may be attached to a mobile device, e.g. a mobile phone, a pad, or a tablet. The display device, e.g. a LCD screen, may also be attached to the mobile device.

Modern mobile phones, pads, or tablets may have two equipped cameras (e.g. a user facing camera and a back facing camera) pointing into two opposite directions. The screen of the mobile device has the same direction as the user facing camera. The camera used in the current setup may either be the user facing camera or the back facing camera.

Setup with Two Cameras:

A possible embodiment of the invention is using environment light estimated from an image of the face of the user captured by the user facing camera for rendering augmentations with consistent illumination between real and virtual objects within another camera image captured by another camera (e.g. back facing camera that points to an opposite direction compared to the user facing camera). The two cameras may be attached to a mobile device, e.g. a mobile phone, a pad, or a tablet. Further, a display device, e.g. a LCD screen, may be attached to the mobile device.

Modern mobile phones, pads, or tablets may have two equipped cameras (i.e. a user facing camera and a back facing camera) pointing into two opposite directions. The two cameras of a mobile device may have a fixed spatial relationship, which may be determined from a calibration procedure, e.g. hand-eye calibration, by using a known planar grid marker or an additional tracking system.

The two cameras may be used in combination with the assumption of a known relation between the coordinate systems of the two cameras. The back facing camera may be used for tracking that could determine a pose of the back facing camera relative to a real environment coordinate system associated with the real environment and/or an object coordinate system associated with a real object located in the real environment. This would allow a desired alignment between the virtual object and the real object in the real environment in the image captured by the back facing camera. Assuming the known relation between the coordinate systems of the two cameras, the estimated illumination from the face of the user captured by the user facing camera can be transformed into the real environment coordinate system and/or the object coordinate system. This would allow rendering augmentations with consistent illumination between real and virtual objects within the camera image of the back facing camera.

Another embodiment of the invention is using environment light estimated from an image of the face of the user captured by the user facing camera for rendering augmentations with consistent illumination between real and virtual objects within an image captured by the user facing camera. In this case, the back facing camera may be used to estimate to a motion of the first camera in a real environment coordinate system associated with the real environment.

In another embodiment of the invention, one of the two cameras may be used to estimate environment light, according to which an image captured by the other camera could be analyzed or processed. Various image processing or computer vision methods could be performed on the captured image according to the estimated environment light. For example, image based face recognition methods are heavily depending on illumination of the face. A face recognition method could be performed to recognize a face in an image of the face captured by one of the two cameras according to environment light estimated by images captured by the other camera. The estimated environment light could be used to re move or determine at least part of face illumination in the image of the face. Further, a vision based tracking method may be applied to track an object (e.g. a table) in an image of the object captured by one of the two cameras according to environment light estimated by using images captured by the other camera. The estimated environment light could be used to remove or determine at least part of illumination on the object or to recover original texture of the object in the image. A depth camera may be preferred to be used as one of the two cameras to capture the image of the face or the object. A 3D surface of the face or the object provided by the depth camera and the estimated light could be used together to remove or determine the at least part of illumination on the face or the object. Particularly, a setup of two cameras having opposite direction would benefit from this embodiment, as environment light falling on the face or the object captured in the image by one of the two cameras could be directly captured by the other opposite camera.

In both one-camera and two-camera setups, in certain scenarios, a pose of the face relative to the user facing camera may have to be determined in order to align the virtual object with the face in an image captured by the user facing camera. For example, overlaying a head-wearable virtual object, e.g. a glasses or a hat, onto the image of the face would require placing the head-wearable virtual object onto a desired position in the image of the face. Determining the pose of the face relative to a camera could be based on model based methods (like in Yang, Ruigang, and Zhengyou Zhang, "Model-based head pose tracking with stereovision," Fifth IEEE Conference on Computer Vision and Pattern Recognition (CVPR), 2011 ("Yang")) or machine learning based methods (like in Fanelli, Gabriele, et al., "Real time head pose estimation with random regression forests," IEEE Conference on Computer Vision and Pattern Recognition (CVPR), 2011 ("Fanelli")) according to images of the face captured by the camera.

For both embodiments of setup, i.e. one-camera and two-camera setup, the normal of the display device of the mobile device and the optical axis of the user facing camera are preferred to have the same direction. In this case, as the user would observe the visual information of the augmented scene on the display device, the face of the user would mostly or always be captured by the user facing camera. Thus, environment light could be always estimated based on images of the face.

The embodiments, aspects and examples described herein with respect to the method can equally be implemented by the processing system being configured (by software and/or hardware) to perform the respective steps. Any used processing device may communicate via a communication network, e.g. via a server computer or a point to point communication, with one or more cameras and/or any other components.

According to another aspect, the invention is also related to a computer program product comprising software code sections which are adapted to perform a method according to the invention. Particularly, the software code sections are contained on a computer readable medium which is non-transitory. The software code sections may be loaded into a memory of one or more processing devices as described herein. Any used processing devices may communicate via a communication network, e.g. via a server computer or a point to point communication, as described herein.

BRIEF DESCRIPTION OF THE DRAWINGS

Aspects and embodiments of the invention will now be described with respect to the drawings, in which.

DETAILED DESCRIPTION

Figure 1:
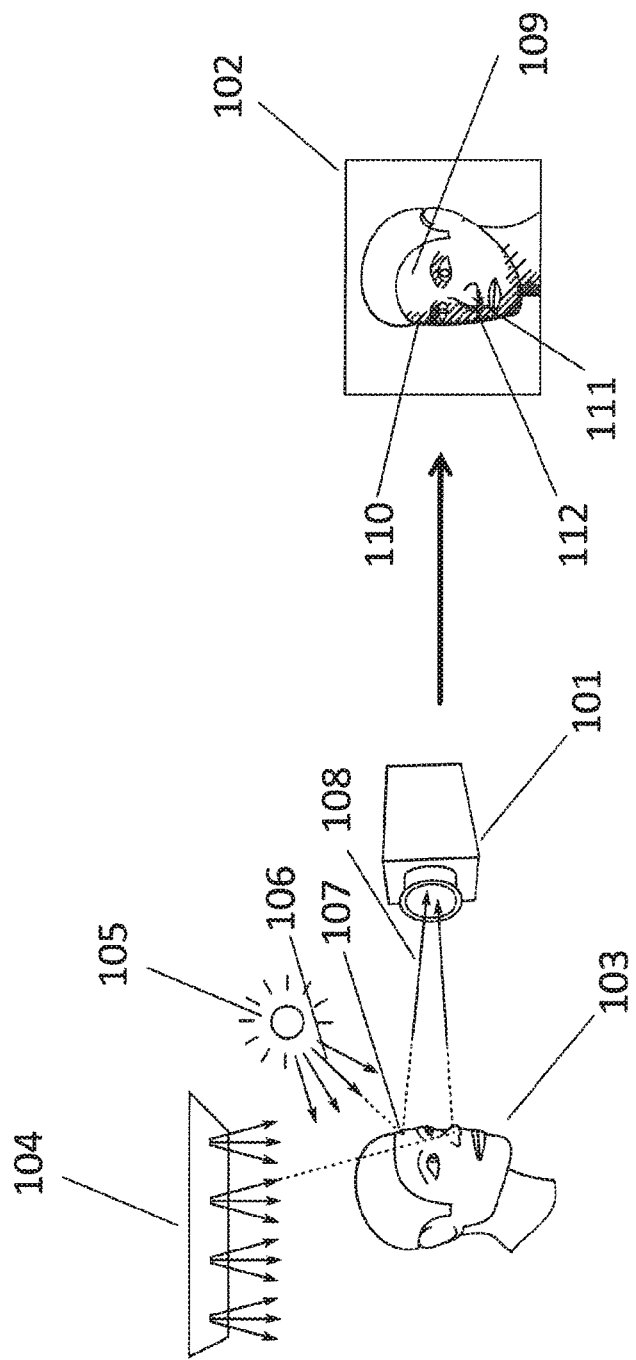
FIG. 1 shows a method of capturing a user's face in an image, and a general set-up according to an embodiment of the present invention.

FIG. 1 illustrates a method of capturing a user's face in an image, and a general set-up according to an embodiment of the present invention, where a user facing camera 101 is recording an image 102 of a face 103 of the user. The face 103 of the user is lit by light coming from the scene, for example from an area light source 104 and/or a point light source 105. For example, a ray of light 106 is emitted from the point light source 105, hits the face at the forehead 107 and is partly reflected as a reflected ray of light 108 towards the camera 101, where the reflected ray of light 108 is converted to one or more pixel intensities at location 109 in the final image 102. The light 106 falling on the face is also called face-incident light.

The more light intensity is reflected back towards the camera, the brighter the corresponding region appears in the image. The intensity of the ray of light reflected at a particular location of the face depends amongst others on the intensity of the rays of light effectively arriving at this location. This depends on whether a surface is oriented towards an incident ray of light (see for example the brighter left side of the forehead 109 compared with the darker right side 110 of the forehead of the face (called attached shadow). Also, it depends on the occlusion of rays of light by other surface parts visible as cast shadows, where for example the nose 111 occludes the ray of light emitted by the point light source 105 towards the right cheek 112 and casts a shadow below the nose and onto the right cheek.

Figure 2:
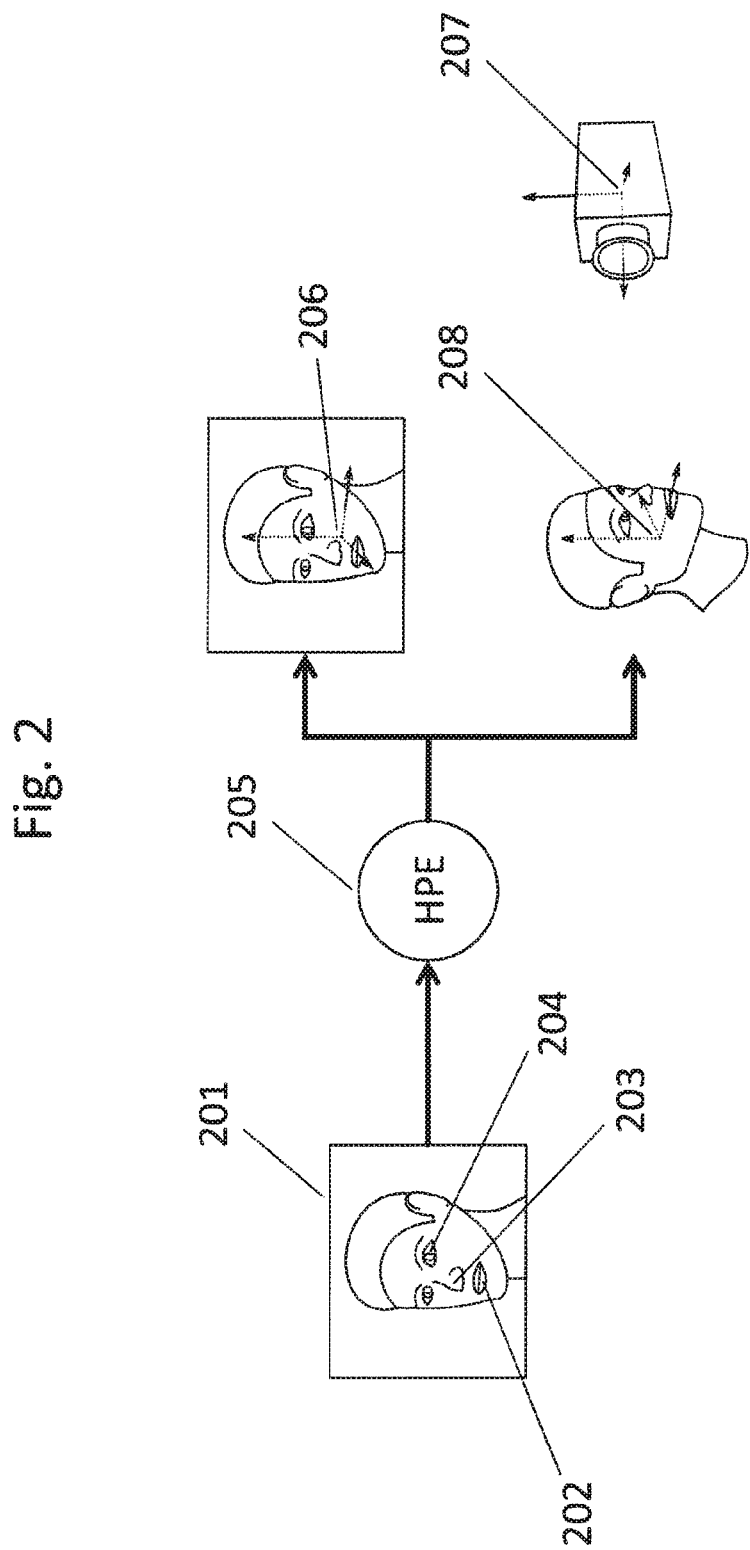
FIG. 2 shows a step for estimating a head pose according to an embodiment of the present invention.

FIG. 2 illustrates a step for estimating a head pose according to an embodiment of the present invention. An image 201 shows the user's face and contains multiple face parts like mouth 202, nose 203 and eyes 204 which are used within a head pose estimator (HPE) 205 for determining the pose of the head 208 with respect to the coordinate system of the user facing camera 207 and its image coordinate system 206 respectively.

Figure 3:
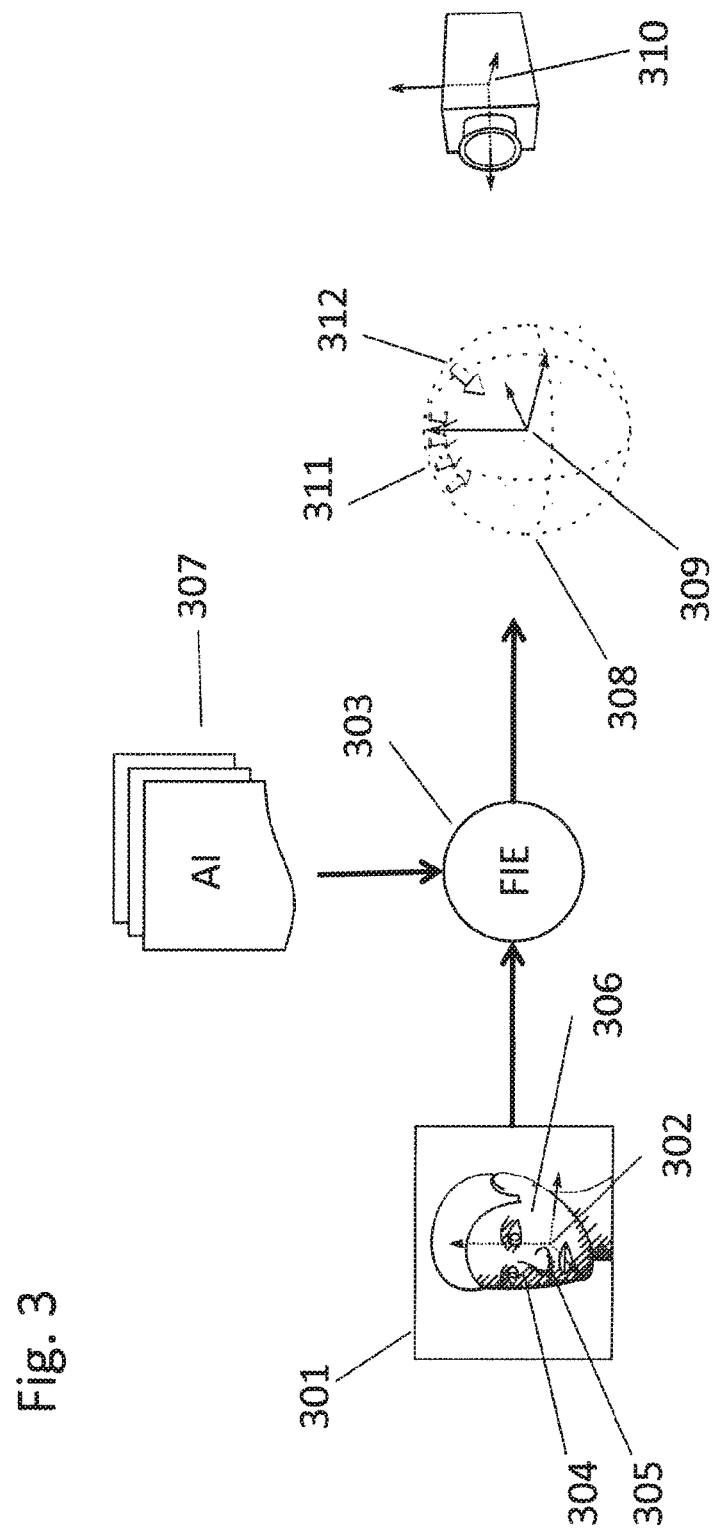
FIG. 3 shows a step for estimating the illumination according to an embodiment of the present invention.

FIG. 3 illustrates a step for estimating the illumination according to an embodiment of the present invention. An image 301 of the face of the user together with the determined pose of the head 302 is input to the facial illumination estimator (FIE) 303. Based on the image intensities showing lit regions 306 and shadowed regions 304, 305 of the face, optionally provided with additional input (AI) 307 like, for example, depths values, the face-incident light 308—which is a part of the light field of the real world at the particular location 309 of the face determined with respect to the user facing camera coordinate system 310—is reconstructed showing two groups of directions with dominant incident light intensity 311, 312. Face specific characteristics (see section Human face and human face specific characteristics below) could also be used to determine the face-incident light 308 in the facial illumination estimator (FIE) 303.

Figure 4:
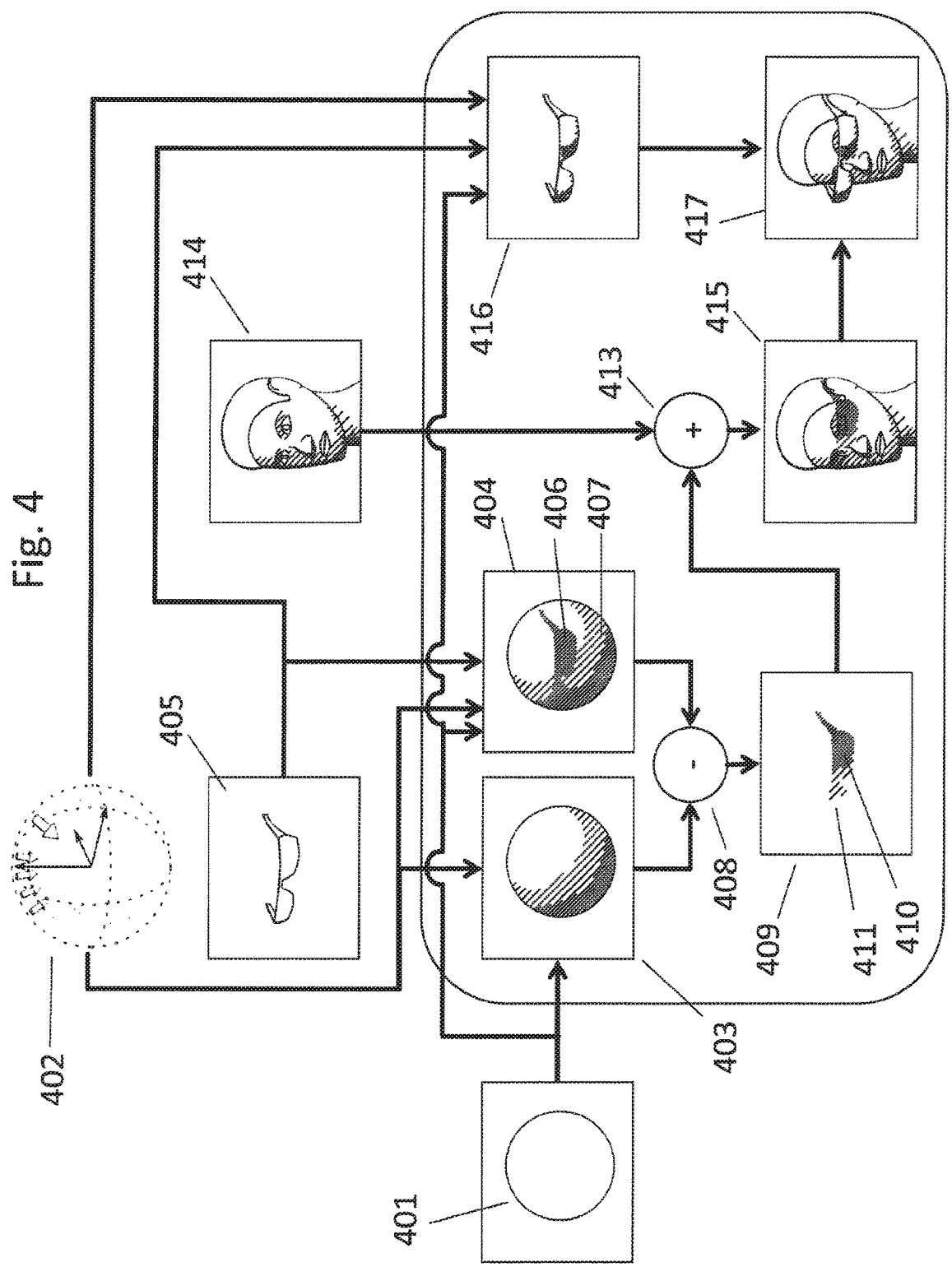
FIG. 4 shows a differential rendering step according to an embodiment of the present invention.

FIG. 4 illustrates a differential rendering step according to an embodiment of the present invention that can be used for blending in a virtual object on a display device in a view of the real environment according to the at least one first light determined in the illumination estimation step. Based on a proxy object 401 which substitutes the 3D geometry and material part of the real world scene that is influenced by the addition of the virtual content, two global illumination solutions are rendered. The first one is an image 403 of the proxy object 401 alone under the estimated lighting conditions 402 of the real world. The second one is an image 404 of the proxy object 401 under the estimated lighting conditions 402 of the real world with the illumination of the proxy object influenced by the virtual object, for example virtual glasses 405. The image 404 contains shadowing and light interreflections of the combined scene of proxy and virtual object, for example shadow 407 from the real scene as well as shadow 406 cast from the virtual object onto the real scene. The first image 403 is subtracted (step 408) from the second image 404 so that the resulting image 409 does only contain the difference in lighting between the two solutions like for example shadow regions 410 introduced by the virtual object, but not those shadow regions 411, that were already shadowed before.

The image 409 is added in step 413 to the image 414 captured of the real environment. This would create an image 415 of the real scene under the estimated lighting conditions 402 additionally modified by integrating the virtual object 405 into the real scene. Finally, this image 415 is combined (step 416) with a rendering of the virtual object 405 under the estimated lighting conditions 402 with the illumination of the virtual object influenced by the proxy object in the final augmented image 417.

Figure 5:
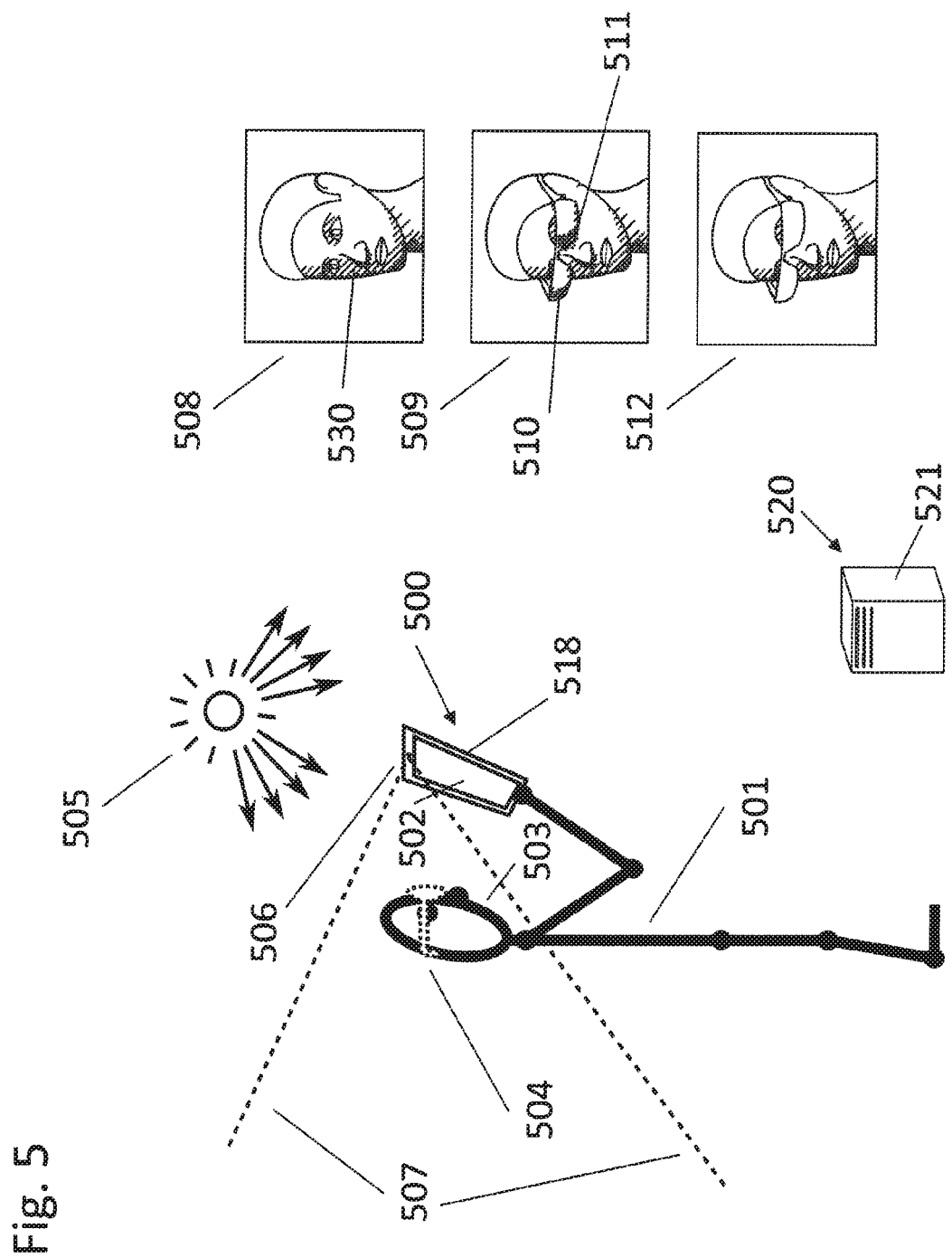
FIG. 5 shows a possible embodiment according to the present invention.

FIG. 5 illustrates a possible embodiment according to the present invention, where a user 501 is experiencing an augmented reality scenario on a display screen 502 showing an image 509 of the user's head and face 503 combined with virtual content like virtual glasses 504. The user's face is illuminated by a light source 505 and captured by a user facing camera 506 with a certain field of view 507.

The camera 506 may be a part of or associated with a mobile device 500 (for example, a tablet computer or smartphone), which includes a processing device 518 (such as a microprocessor). By way of example, the mobile device 500 (or its processing device 518) may communicate with a server computer 520 having a processing device 521 (such as a microprocessor), which at least in part may be configured to carry out some of the method steps as described herein. As such, the processing devices 518 and 521 may communicate with each other in wired manner or wirelessly (e.g. over a network, such as the Internet) and form a processing system, which is configured by appropriate hardware and software configuration to implement at least part of the method steps as described herein. A processing system for performing a method as disclosed herein may also comprise the processing device 518 or 521 without the respective other one of the processing devices. The mobile device 500 and/or the server computer 520, or any of their processing devices 518, 521, may form a system for representing a virtual object in a view of a real environment, here on the display screen 502.

A similar configuration can also be used in the other embodiments described herein, e.g. in the embodiment described with reference to FIG. 7.

The image 508 captured by the camera 506 shows the face 503 lit by the light source 505. By estimating the face-incident light emitted from the light source 505 from the appearance of the face of the user in the image 508, the virtual object can be rendered with an estimated real world illumination and combined with the captured user-facing image using differential rendering. The result is an image 509 featuring consistent illumination between the visible virtual and real parts—see the consistent shading 510 of the virtual glasses 504 as well as shadow 511 cast by the virtual glasses 504 onto the real face. Compared with an image 512 without consistent illumination between the real and virtual content, the image 509 provides a much more realistic result.

The determined light falling on the face 503 can also be used to remove effects (e.g. shading 530) on the appearance of the face 503 in the image 508 caused by the determined light. Then, apply at least one virtual light (e.g. computer generated light) to illuminate the image (i.e. the image 508 after removing the shading 530) of the face and the virtual object that is overlaid to the image in order to have the same illumination of real and virtual object (i.e. the face 503 and the virtual glasses 504).

Figure 6:
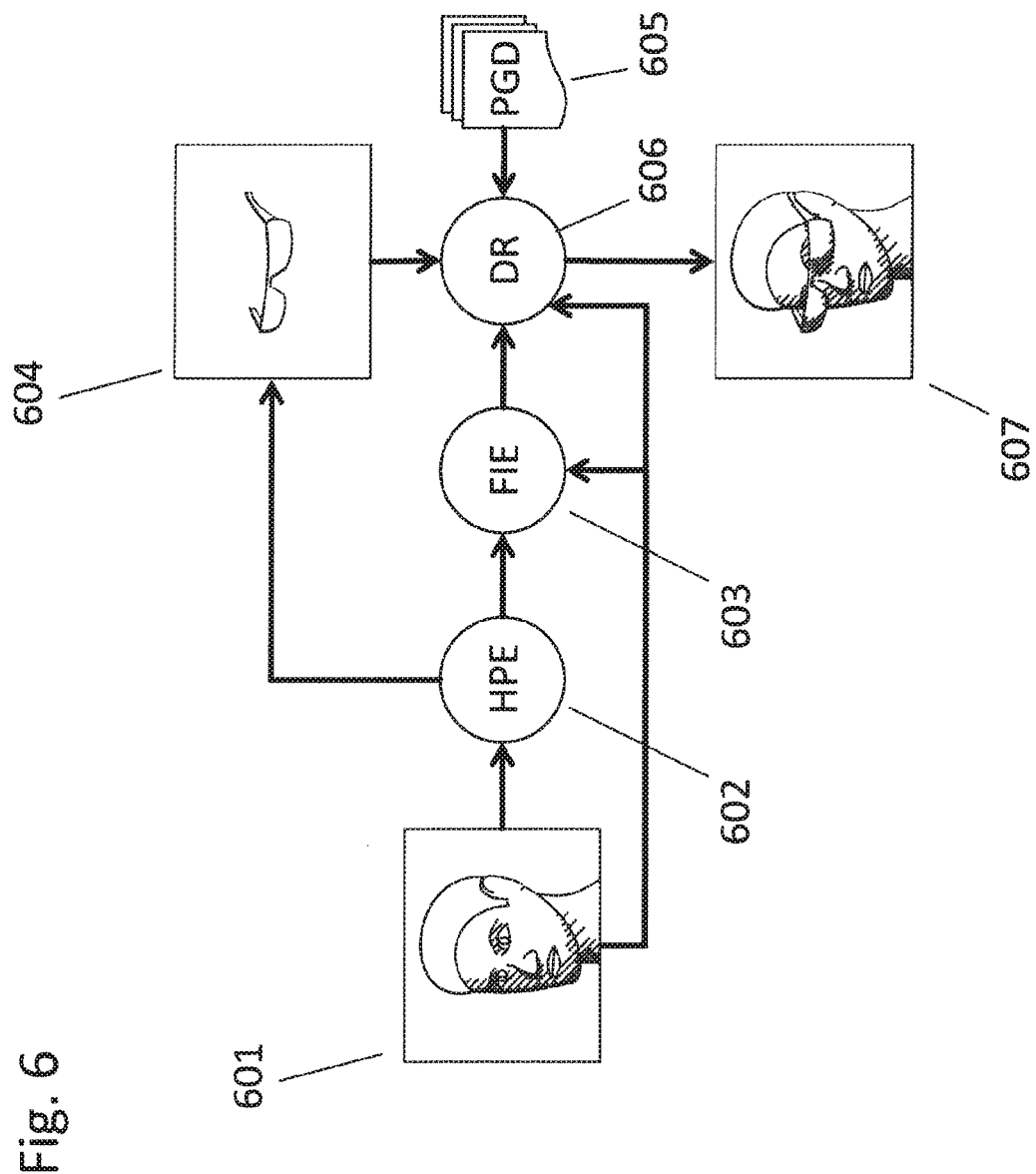
FIG. 6 shows a flow diagram according to an embodiment of the invention with an exemplary scenario as described with reference to FIG. 5.

FIG. 6 shows a flow diagram according to an embodiment of the invention with an exemplary scenario as described with reference to FIG. 5, where the user is experiencing an augmented reality scenario on a display screen showing an image 607 of the user's face itself combined with virtual content like virtual glasses. An image 601 of the face of the user is captured by a user facing camera. The head pose is determined in step HPE 602 (Head Pose Estimator) based on the image 601. Based on the image 601 and the determined pose from step 602, the face-incident light from light sources within the real scene is determined in step FIE 603 (Facial Illumination Estimator). Based on the determined pose the virtual object 604 is registered. Based on the captured image 601, registered geometry, estimated illumination as well as a proxy geometry definition (step 605) (PGD), which substitutes the 3D geometry and material part of the real world scene that is influenced by the addition of the virtual content, a differential rendering step 606 (DR) process produces the augmented image 607.

Figure 7:
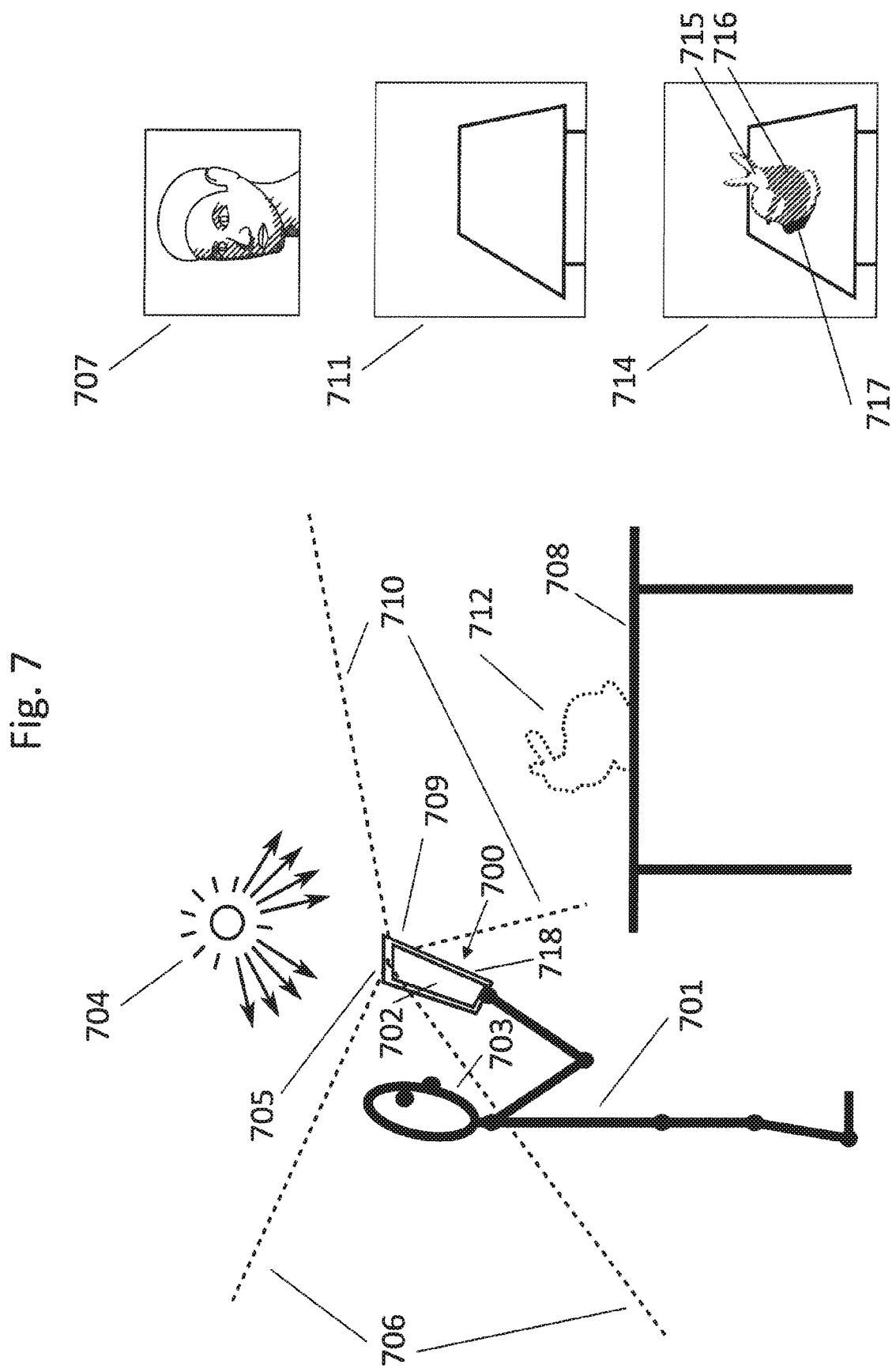
FIG. 7 shows a possible embodiment according to the present invention.

FIG. 7 illustrates a possible embodiment according to the present invention, where a user 701 is experiencing an augmented reality scenario on a display device 702 showing an image 714 of a real scene—for example a table 708—in front of the user combined with virtual content—for example a rabbit 712. The user 701 is holding a mobile device 700 (e.g. a tablet computer or smartphone), which is equipped with a processing device 718, the display device 702, a user facing camera 705, and another (here: back facing) camera 709. The user's face 703 is illuminated by a light source 704 and captured by the user facing camera 705 (first camera) with a certain field of view 706. The resulting image 707 shows the face lit by the light source. The face-incident light emitted from the light source 704 (generally, the representation of the illumination) is estimated (or reconstructed) from the appearance of the face of the user in the image 707. The scene in front of the user, comprising the table 708, is captured by the camera 709 (second camera) with a certain field of view 710 and creates an image 711 of the table under illumination. From this image, also the pose of the camera 709 within the real world can be determined.

Under the assumption that the camera coordinate systems of both cameras 705 and 709 are registered to each other, the reconstructed representation of the illumination is transferred from the coordinate system of the user facing camera 705 into the coordinate system of the back facing camera 709. Now the virtual content like the rabbit 712 can be rendered with the estimated real world illumination and combined with the image 711 captured by the back facing camera 709 using differential rendering resulting in the augmented image 714 featuring consistent illumination of the real table and the virtual rabbit, for example highlights 715 and shadows 716 on the virtual rabbit as well as shadows 717 cast by the virtual geometry onto the real table 708.

Figure 8:
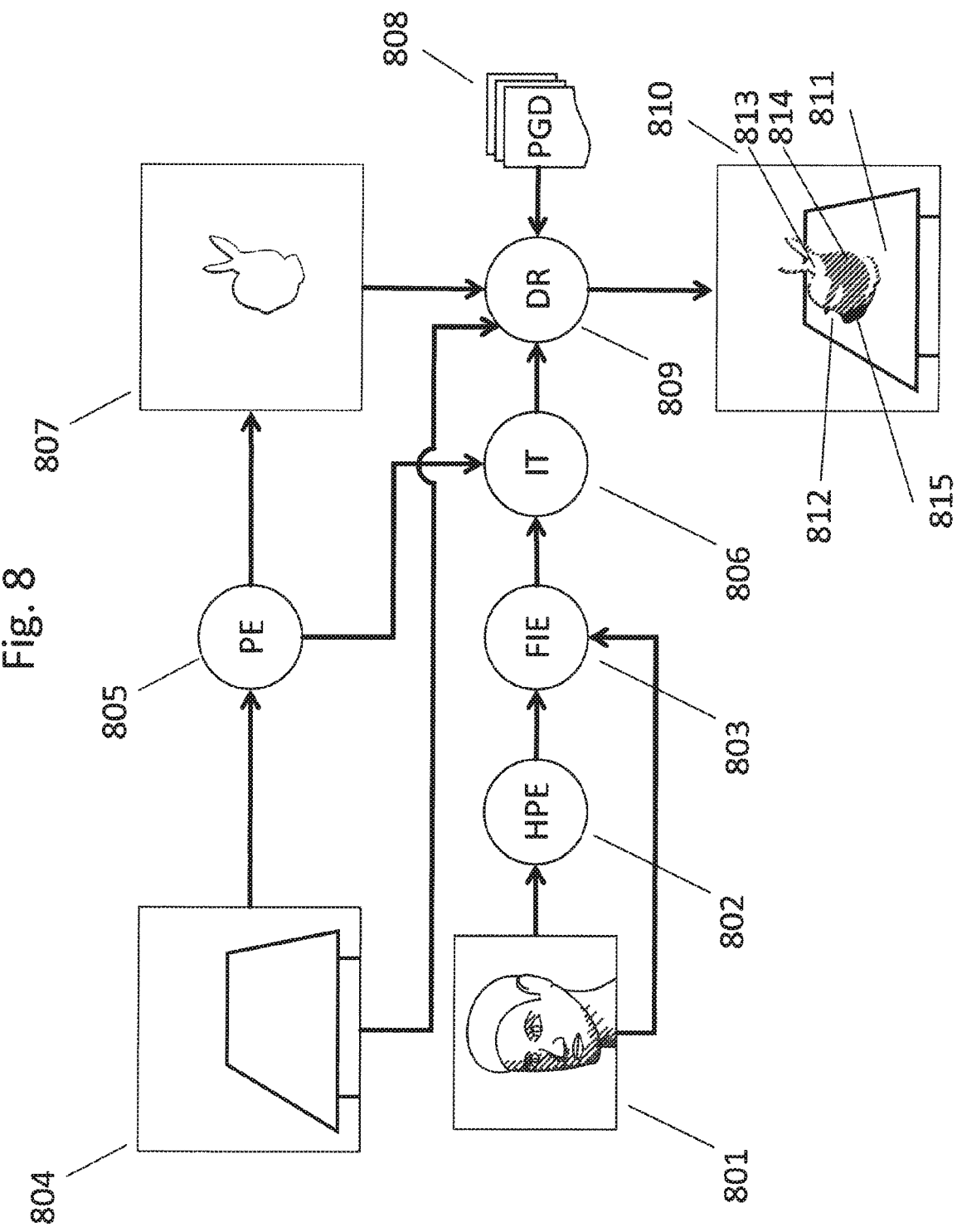
FIG. 8 shows a flow diagram according to an embodiment of the invention with an exemplary scenario as described with reference to FIG. 7.

FIG. 8 shows a flow diagram according to an embodiment of the invention with an exemplary scenario as described with reference to FIG. 7 where the user is experiencing an augmented reality scenario on a display screen showing an image 810 of a real scene in front of the user comprising a table 811 combined with virtual content like a virtual rabbit 812. An image 801 is captured of the face of the user by a user facing camera. The head pose is determined in step HPE 802 (Head Pose Estimator) based on the image 801. Based on the image 801 of the face and the determined pose from step 802, face-incident light from light sources within the real scene is determined in step FIE 803 (Facial Illumination Estimator). Moreover, e.g. at the same time, an image 804 is captured of the real scene using a back facing camera. The camera pose within the scene is determined in step PE 805

(Pose Estimator). Under the assumption that the camera coordinate systems of both cameras are registered to each other, the reconstructed representation of the illumination is transformed in step IT 806 (Illumination Transformation) into the coordinate system of the back facing camera or into the world coordinate system, respectively, based on the actual pose estimation within the scene from step PE 805. Based on the determined pose from step PE 805, the virtual geometry is registered (step 807). Based on the captured image 804, registered geometry (807), estimated transformed illumination from step IT 806 as well as a proxy geometry definition 808 (PGD), which substitutes the 3D geometry and material part of the real world scene that is influenced by the addition of the virtual content, a differential rendering process in step DR 809 (Differential Rendering) produces the augmented image 810 with consistent illumination of real objects 811 and virtual objects 812 including consistent shading like highlights 813 and attached shadows 814 as well as shadow casts 815.

Figure 9:
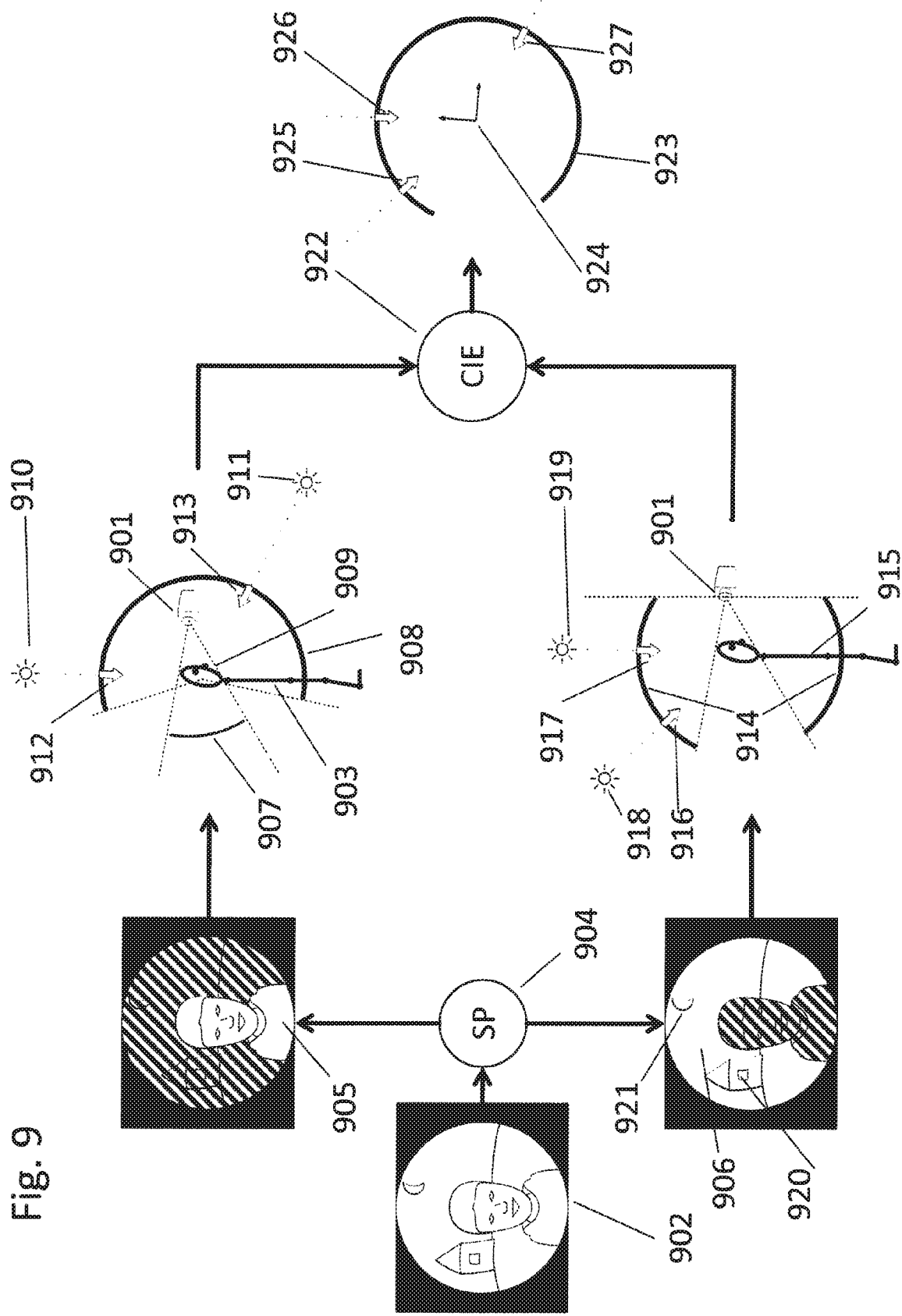
FIG. 9 shows an embodiment according to the present invention.

FIG. 9 illustrates an embodiment according to the present invention, where a user-facing camera 901 takes an image 902 showing the user 903 in front of a background environment. In particular, a camera equipped with a wide angle lens like a fish-eye lens is preferable in order to capture a wide field of view. The image 902 is segmented in step SP 904 (segmentation procedure, for example based on depth information) into the user part 905 showing the user and the background part 906 showing the background environment. The region 907 of the user part of the image corresponding to the face is used to estimate face-incident light coming from the coverage 908 of directions in front of the user 903 incident on the face 909 of the user. For the two light sources 910 and 911 face-incident light is estimated coming from two directions 912, 913.

The part 906 of the image showing the environment is used as direct capture of incoming light from the specific coverage of directions 914 mainly behind the user. Two main directions 916, 917 with dominant light intensities are determined in the image. One direction 916 corresponding to a light source 918 behind the user 915 is visible as resulting from a window 920, and one direction 917 corresponding to a light source 919 above the user 915 is visible as resulting from the moon 921.

Combining the estimated information about light directions 912, 913, 916, 917 from the direct light capture from background environment image part 906 and the estimated illumination from the user face part 905 in step CIE 922 (Combined Illumination Estimation), leads to a more complete representation of the real illumination at the position 924 of the user with a bigger coverage 923 of directions. The light estimation for light from above directions 912 and 917 exists in the user part 905 as well as in the environment part 906 and is combined into a more robust estimation 926 by, for example, averaging or taking the more reliable estimation. Light 925 from behind the user is taken from the environment part 906, while light 927 in front of the user is taken from the user part 905.

Figure 10:
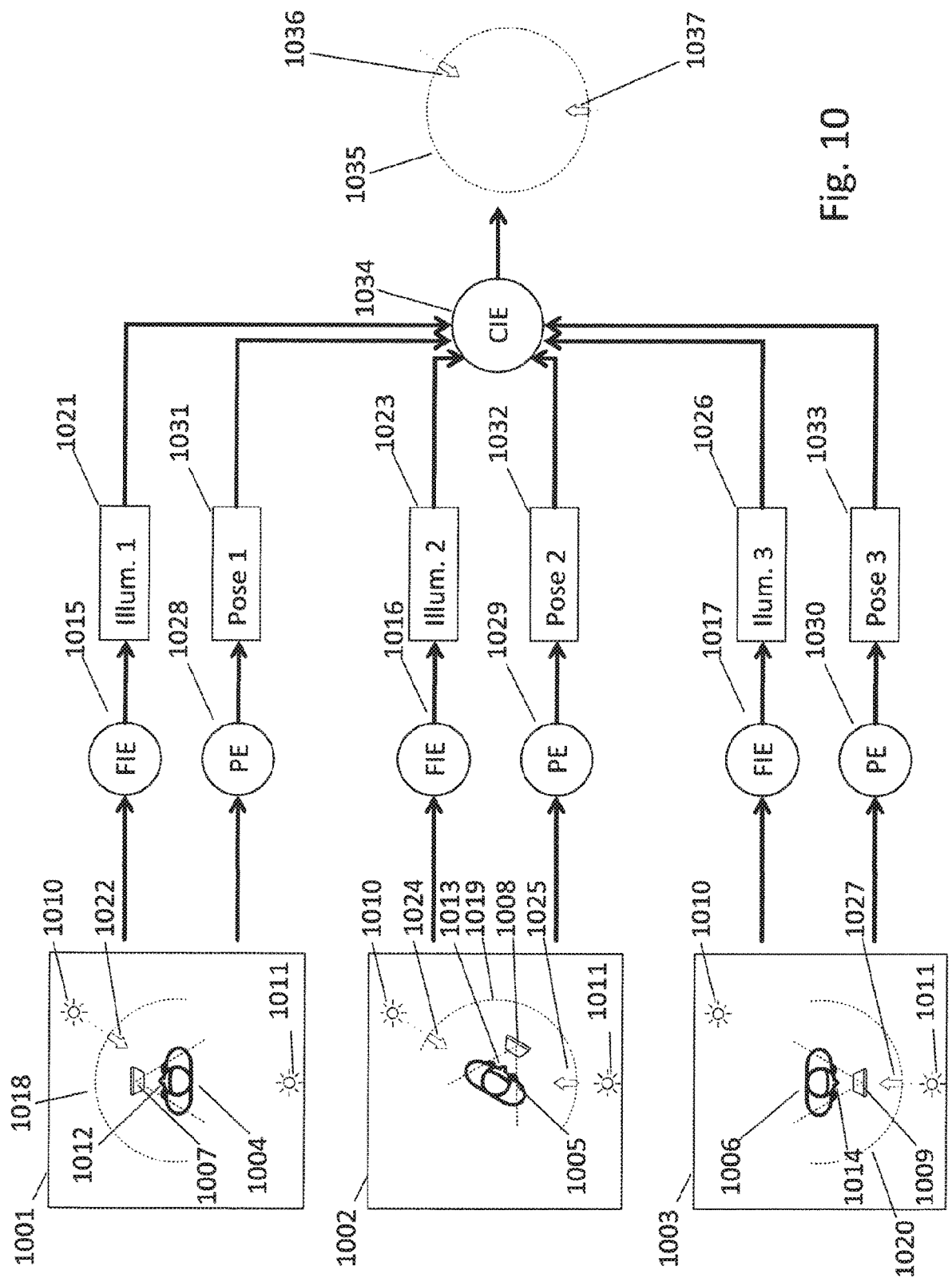
FIG. 10 illustrates a possible embodiment according to the present invention.

FIG. 10 illustrates a possible embodiment according to the present invention, where multiple measurements each with a rotated set-up are integrated into a light estimation 1035. Scenes 1001, 1002, 1003 show the scenario from above at different points in time. A user 1004, 1005, 1006, respectively, is turning around subsequently keeping a user facing camera 1007, 1008, 1009 in front of his face. Two light sources 1010, 1011 illuminate the scene including the face 1012, 1013, 1014 of the user 1004, 1005, 1006. At each point in time an image of the face 1012, 1013, 1014 is taken by the camera 1007, 1008, 1009. In step FIE 1015, 1016, 1017 (Face Illumination Estimator) from each image the face-incident light for the coverage 1018, 1019, 1020 of directions in front of the user 1004, 1005, 1006 is estimated. Estimated "Illumination 1" 1021 contains an estimation of a dominant incident light direction 1022 which corresponds to the light ray coming from light source 1010. The light ray coming from the direction of light source 1011 cannot be estimated because it is positioned far behind the user 1004 and therefore has nearly no influence on the appearance of the face 1012 of the user 1004. Estimated "Illumination 2" 1023 contains an estimation of a dominant incident light direction 1024 which corresponds to the light ray coming from light source 1010. Also a second dominant incident light direction 1025 is estimated, corresponding to the light ray coming from light source 1011. Estimated "Illumination 3" 1026 contains an estimation of a dominant incident light direction 1027 which corresponds to the light coming from light source 1011. The light coming from the direction of light source 1010 cannot be estimated because it is positioned far behind the user 1006 and therefore has nearly no influence on the appearance of the face 1014 of the user 1006.

With the capturing of the images, the respective camera pose is determined with respect to the environment in step PE 1028, 1029, 1030 (Pose Estimator) resulting in determined "Pose 1" 1031, "Pose 2" 1032 and "Pose 3" 1033, respectively. The pose determination can, for example, be based on inertial sensors, compass, image based tracking on the background of the user facing camera or using an additional back facing camera. The result is a captured sequence of images of the user's face 1012, 1013, 1014 showing the illuminated face under different rotations, corresponding determined poses 1031, 1032, 1033 and estimated illuminations 1021, 1023, 1026. The different overlapping parts 1018, 1019, 1020 of the estimated incident directional real world light conditions (illuminations) 1021, 1023, 1026 are combined into a combined light estimation based on the particular determined poses 1031, 1032, 1033 in step CIE 1034 (Combined Illumination Estimator). The resulting combined estimation 1035 gives a more robust and complete estimation for the real world lighting condition and includes estimates for all light directions including light incident from directions 1036, 1037 corresponding to the light sources 1010, 1011.

Figure 11:
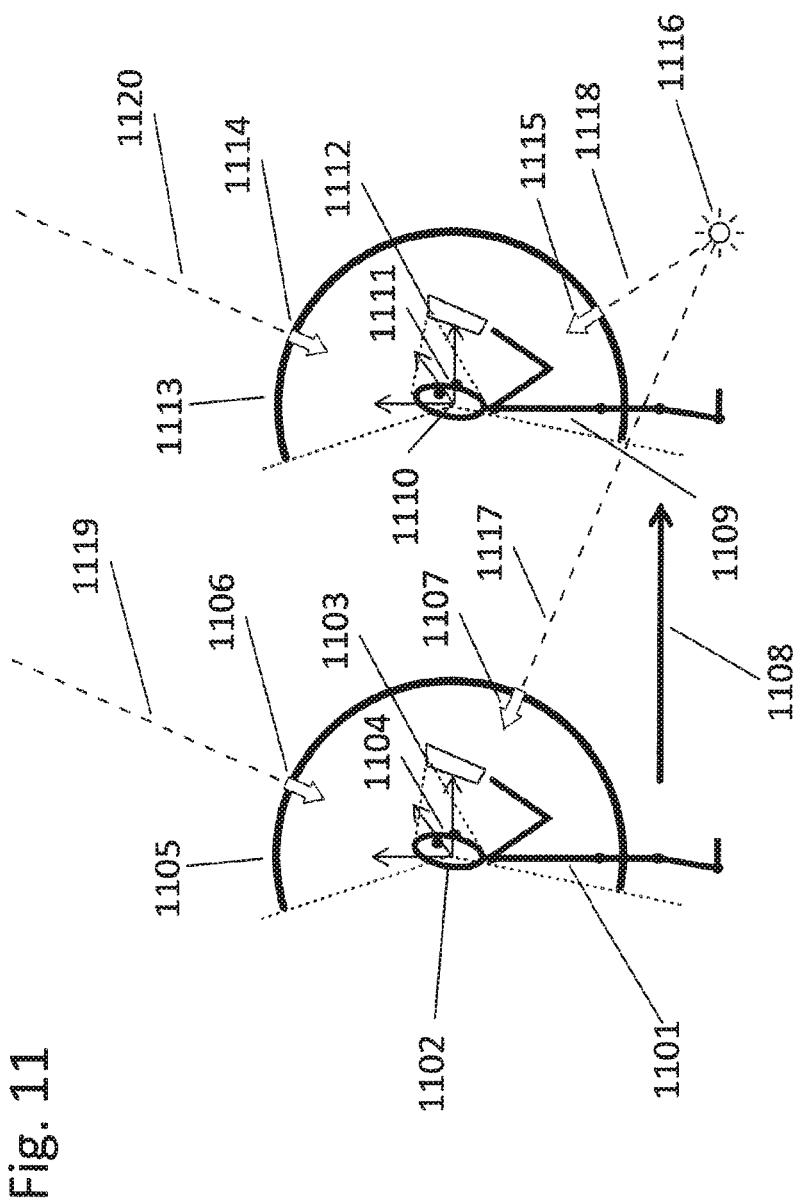
FIG. 11 shows another possible embodiment according to the present invention.

FIG. 11 illustrates a possible embodiment according to the present invention, where multiple measurements at different locations are integrated into a light estimation. The user 1101 is first located at position 1102. A user facing camera 1103 captures an image of the face 1104 of the user from which information about light coming from the coverage 1105 of directions in front of the user 1101 with respect to position 1102 is estimated. Incident light is determined for two directions 1106 and 1307. Then, the user 1109 moves (depicted by move 1108) to a second location 1110 (right depiction). Here, again an image is taken of the face 1111 of the moved user 1109 using the user facing camera 1112. From this image, information about light coming from the coverage 1113 of directions in front of the user 1109 with respect to position 1110 is estimated. Incident light is determined for two directions 1114 and 1115.

Assuming that the difference (move 1108) between the two poses 1102 and 1110 is determined (for example, based on inertial sensors, or image based tracking on the background of the user facing camera, or using an additional back facing camera) 3D information about the light sources corresponding to the determined directions of incident light can be extracted via triangulation of the back projected light directions. From the determined directional information of light direction 1107 and light direction 1115, the 3D position of a light source 1116 is recovered at the intersection point of the corresponding back projected rays 1117 and 1118 from position 1102 and 1110 into directions 1107 and 1115. The corresponding back projected rays 1119 and 1120 for the determined directional information of light direction 1106 and light direction 1114 from position 1102 and 1110 into direction 1106 and 1114 are parallel and thus intersect at infinity. The corresponding light source is assumed to be infinitely far away. Still the two estimations for directions 1106, 1114 can be combined, for example, by taking the average to get a more robust estimation.

Figure 12:
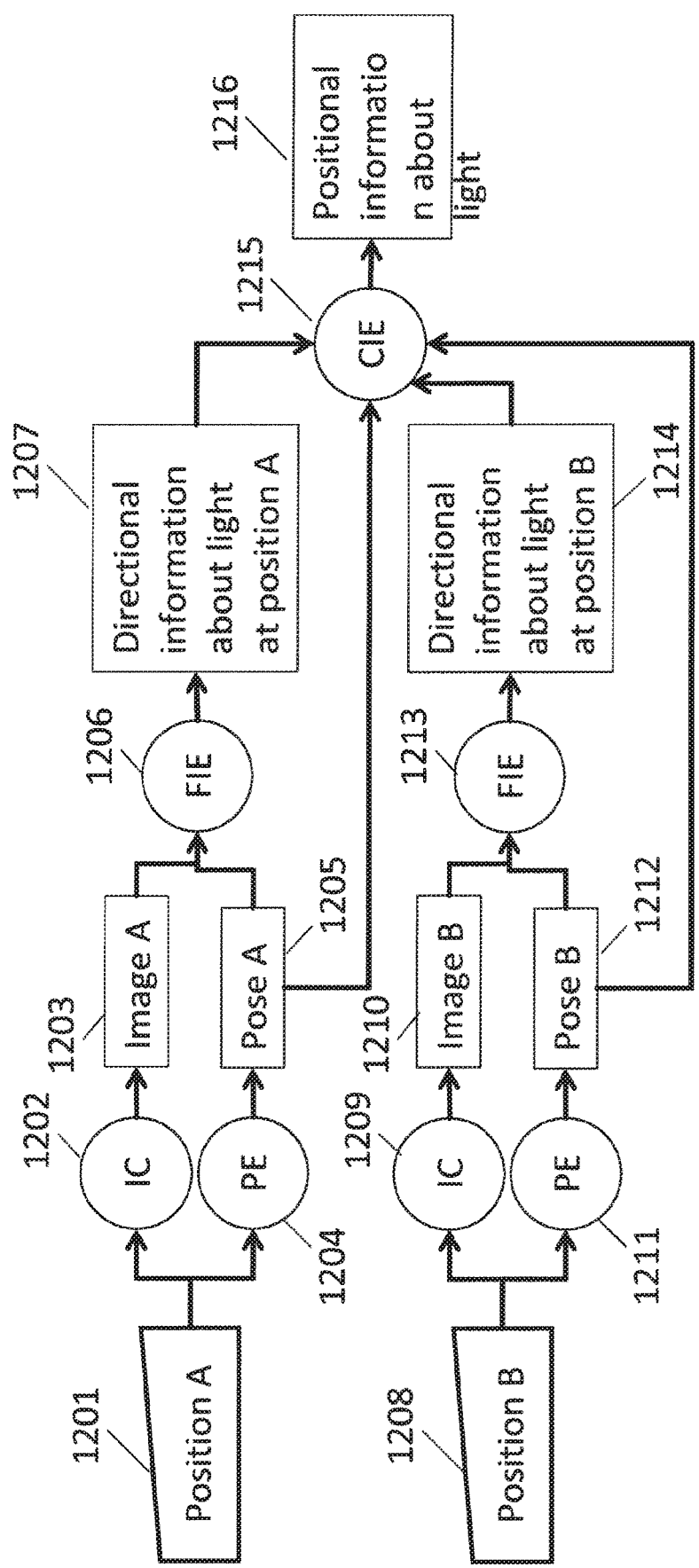
FIG. 12 shows a flow diagram according to an embodiment of the invention with an exemplary scenario as described with reference to FIG. 11.

FIG. 12 shows a flow diagram according to an embodiment of the invention with an exemplary scenario as described with reference to FIG. 11, where multiple estimations about incident light at different locations are combined to extract positional information about the light. At position A 1201, an image A 1203 of the face of the user is captured in step IC 1202 (Image Capture) as well as the corresponding pose A 1205 of the camera used within step 1202 is determined by a PE step 1205 (pose estimation). This step can, for example, be based on inertial sensors, or image based tracking on the background of the user facing camera, or using an additional back facing camera. From Image A 3203 and Pose A 1205 directional information 1207 about incident light at position A is estimated by a FIE step 1206 (facial illumination estimator).

The user then moves together with the camera to a new position B 1208. At position B 1208, an image B 1210 of the face of the user is captured in step IC 1209 (Image Capture) as well as the corresponding pose B 1212 of the camera used within step 1209 with respect to pose A 1205 is determined by a PE step 1211 (pose estimation). This step can, for example, be based on inertial sensors, or image based tracking on the background of the user facing camera, or using an additional back facing camera. From Image B 1210 and Pose B 1212, directional information 1214 about incident light at position B is estimated by a FIE step 1213 (facial illumination estimator).

Within a CIE step 1215 (combined light estimation), the measurements 1203, 1210 and directional estimations 1207, 1214 and the corresponding determined poses 1205, 1212 are combined and positional information 1216 about the light within the scene is extracted.

Figure 13:
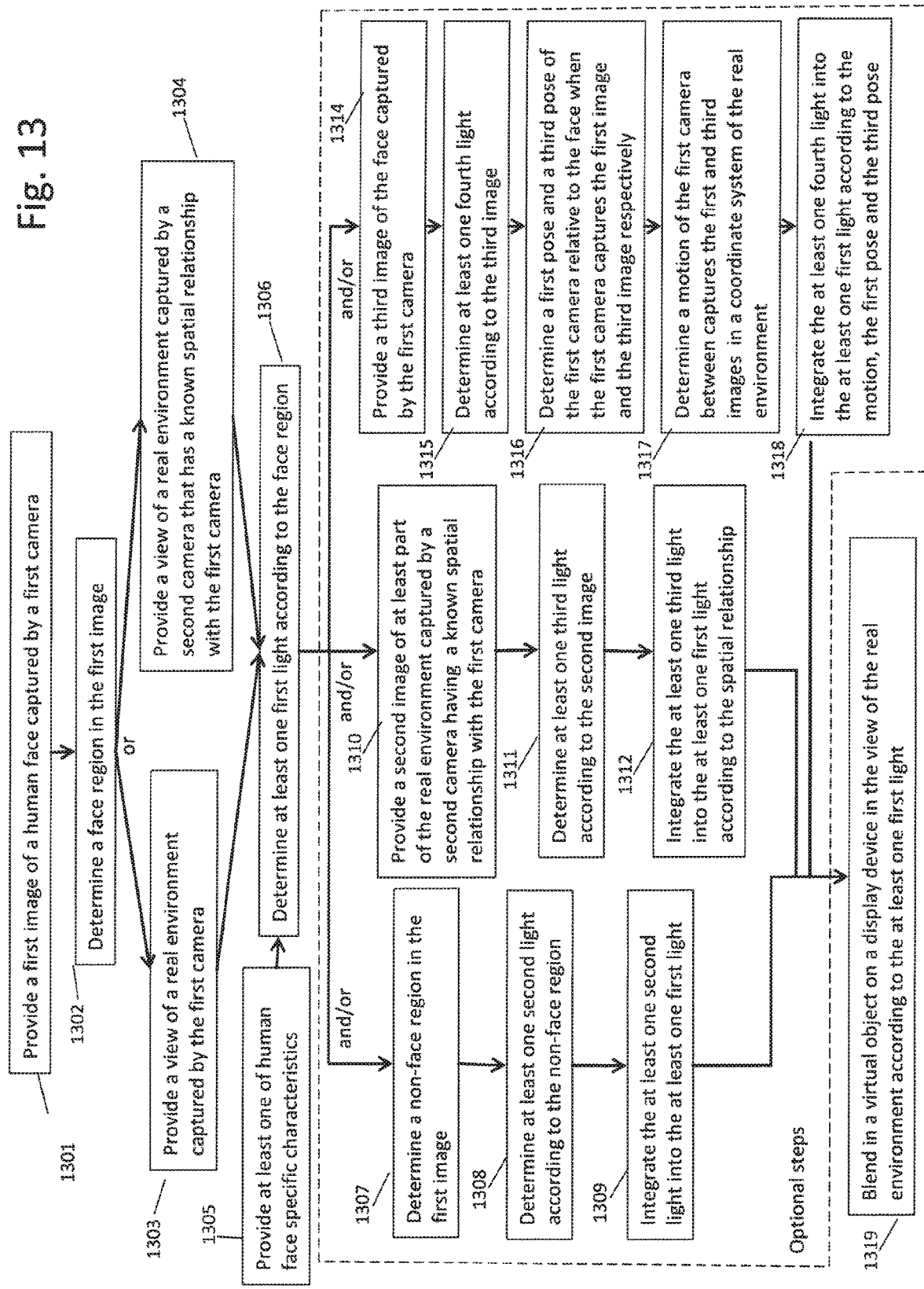
FIG. 13 shows a flow diagram of an embodiment for representing a virtual object in a view of a real environment according to an embodiment of the invention.

FIG. 13 shows a flow diagram of an embodiment for representing a virtual object in a view of a real environment according to an embodiment of the invention.). In the following, when it is referred to a configuration according to the embodiment of FIG. 7, the respective steps may analogously be applied to a configuration according to the embodiment of FIG. 5, and vice versa.

Step 1301 provides a first image of a human face (particularly, a user's face) captured by a first camera. The face may be a face of a user who is observing visual content displayed on a display device when the first camera captures the first image. The first camera may be fixed to a mobile device (for example, to mobile device 500 or 700, as shown in FIGS. 5 and 7, respectively) which is equipped with the display device. For an example as shown in FIG. 5 or 7, the first camera may be the camera 506 or 705, and the display device may be the screen 502 or 702. The normal of the screen 502, 702 and the optical axis of the camera 506, 705, respectively may have the same direction. The face 503, 703 of the user 501, 701 may be captured by the camera 506, 705 in the image 508, 707 (i.e. the first image).

Step 1302 determines a face region in the first image. The face region includes at least part of the face in the first image. The face region may contain an image area of the face or multiple disconnected image areas of the face in the first image. The face region may be automatically determined according to various methods, e.g. according to machine learning based face recognition (as described in Fanelli), model based registration (as described in Yang), template matching, and/or feature matching, etc. The face region may also be manually determined. The face region may also be automatically determined by using a depth image or infrared image. The depth image or infrared image may be captured by a depth camera or infrared camera. The face region detection may be according to a known or fixed relationship between the depth camera (or infrared camera) and the first camera. The face region detection may also be according to a matching between the depth image (or infrared image) and the first image.

A view of at least part of a real environment may be captured by the first camera (step 1303) or by a second camera that has a known spatial relationship with the first camera (step 1304). The view of at least part of a real environment may be captured in the first image or captured in an image by the first camera different from the first image. In an example shown in FIG. 5, the image 508 (equivalent to the first image) captured by the camera 506 (equivalent to the first camera) provides a view of at least part of a real environment. In this case, the face 503 of the user 501 is a part of the real environment. In an example shown in FIG. 7, a second camera 709 (equivalent to the second camera) captures the at least part of the real environment in the image 711. In this case, the table 708 is a part of the real environment. Note that, the view of at least part of the real environment may also be captured by an eye, which is a common setup in optical-see through AR applications.

Step 1305 provides at least one human face specific characteristic. A human face specific characteristic could, for example, be a learned or modelled average skin color in a particular face region, that can be used to determine the average light color from the average color of the corresponding region under illumination captured in the first image.

Another human face specific characteristic could be an average surface orientation at different regions of the face, that can be used to determine from which direction what amount of light is coming from the differences in intensity of the corresponding regions under illumination captured in the first image.

Another human face specific characteristic could be a nose region and geometry, which can be used together with a shadow contour detection in the corresponding nose region under illumination captured in the first image to detect the shadow cast by the nose and to determine the main light direction from the shadow contour/location.

Another human face specific characteristic could be an occlusion of the distant environment (and thereby incident light) at a particular face region by another face region, which can also be used to determine from which direction what amount of light is coming from the differences in intensity of the corresponding regions under illumination captured in the first image.

Another human face specific characteristic could be reflectance properties of the face, determining an amount of diffuse, glossy, specular reflection, and/or subsurface scattering at different face regions, that can be used to overcome the limitation to assume a simple lambertian reflection model.

Another human face specific characteristic could be a reflection in the eyes or on the forehead, which can be used to determine the light incident on the face.

Another human face specific characteristic could be some premodeled radiance transfer for a particular face region like basis images of the face or face region under basis illumination (Spherical Harmonics basis, or point lights) which can be used to find the best fitting linear combination resulting in an estimation for the incident lighting.

A human face specific characteristic could, for example, be a suitability rating of a particular face region for usage in light estimation. This could, for example, model the amount of variations in term of geometry and material between different humans at a particular face region or the interference of a particular face region by illumination. If the variance is low, the region is better suited for light estimation.

The above human face specific characteristics may be used individually or in any number and combination for the purposes of the present invention.

Step 1306 determines at least one first light falling on the face according to the determined face region of the first image and the at least one or more human face specific characteristics. Light falling on the face is also called face-incident light. Having the at least one human face specific characteristic, at least one characteristic of the at least one first light could be determined (see also herein under "Face specific characteristics"). The characteristic(s) of the at least one first light includes, but is not limited to, at least one of intensity, wavelength, and direction. Different embodiments of determining face-incident light are disclosed below.

In one embodiment, the face-incident light (e.g. the at least one first light) may be determined according to the first image of the face and a pose of the face relative to the first camera when the first camera captures the first image. In another embodiment, the face-incident light (e.g. the at least one first light) may be determined according to depth information associated with the face region of the first image. A depth camera can be used to alleviate the need for and approximation by a generic 3D face geometry model. A geometry definition, and thereby surface orientation and occlusions can be determined from the depth information about the face of the particular user. At least one of the human face specific characteristics may also be used together with the depth information to estimate the at least one first light as disclosed above.

In another embodiment, the face-incident light (e.g. the at least one first light) may be determined according to a statistical model of face illumination. The statistical model could be generated based on a plurality of images of human faces under different known illumination and poses or 3D models of faces. For example, Zhang, Lei, and Dimitris Samaras, "Face recognition under variable lighting using harmonic image exemplars," IEEE Computer Society Conference on Computer Vision and Pattern Recognition, Proceedings, Vol. 1, 2003 ("Zhang") proposes a method to create a statistical model of face illumination based on a plurality of 3D models of faces.

In another embodiment, the face-incident light (e.g. the at least one first light) may be determined according to face illumination captured in images (i.e. a plurality of images of faces), which is disclosed herein under "Light Estimation based on training images of faces".

Having the determined at least one first light from step 1306, step 1319 may be performed. Step 1319 blends in a virtual object on the display device in the view of the at least part of the real environment according to the at least one first light. In the examples shown in FIGS. 5 and 7, the display device is the display screen 502 and 702, respectively.

For example, in FIG. 5, the view of the at least part of the real environment may be captured in the image 508 (i.e. the first image). The virtual glasses 504 is blended in in the image 508, which results in a composite image 509 shown on the display screen 502. The consistent shading 510 of the virtual glasses 504 as well as shadow 513 cast by the virtual glasses 504 onto the real face are determined according to the at least one first light. In this example, the view of the at least part of the real environment may be captured by the first camera in an image different from the image 508. A data flow diagram of an embodiment of determining consistent shading 510 and the shadow 511 is illustrated in FIG. 4.

In another example shown in FIG. 7, the view of the at least part of the real environment may be captured in the image 711 by the camera 709 (i.e. the second camera). The at least one first light was determined in the coordinate system of the camera 705 (i.e. the first camera) according to the image 707 (i.e. the first image) and may be transformed to the coordinate system of the camera 709 according to a spatial relationship between the two cameras. Then, the at least one first light can be directly applied to blend in the virtual object 712 in the image 711 to generate the image 714 featuring consistent illumination of the real table and the virtual rabbit, for example highlights 715 and shadows 716 on the virtual rabbit as well shadows 717 cast by the virtual geometry onto the real table 708.

It is optional to perform steps 1307-1309 and/or steps 1310-1312 and/or steps 1314-1318 in order to integrate further estimated or determined environment light into the at least one first light.

Step 1307 determines a non-face region in the first image. The non-face region is at least part of image areas that do not contain face in the first image. For example, a non-face region is the background part 906 showing the background environment in FIG. 9, while the first image is the image 902. In this example, the non-face region may also not contain body belong to the user 905. The non-face region may be determined based on the determined face region from step 1302. The non-face region may also be determined according to depth information associated with the first image or a 3D face model.

Step 1308 determines at least one second light according to the non-face region. The determination of the at least one second light is different from the determination of the at least one first light. The background behind the user corresponds to the environment, so that the image directly contains the information about the light coming from the environment behind the user. Compared to light estimation from the face, where the reflected light from the face (visible in the image) is used to estimate what light was originally incident on the face, here the measured intensity per pixel can be used as incident light from the direction corresponding to the pixel, like in Sato.

Step 1309 integrates at least part of the determined at least one second light into the determined at least one first light. The integration of multiple estimations into one can be done in different ways. When the different estimations give estimates for the same quantity, one way to integrate is for example taking a weighted average over the different estimations according to the reliability of each estimation for a particular quantity. Other integration methods could be based on maximum-likelihood estimation, outlier detection and/or cluster analysis. If the different estimations provide estimates for different quantities, for example light two estimations at different positions, the information can still be integrated. See for example FIG. 11, where an estimate for light coming from direction 1107 to position 1102 and an estimate for light coming from direction 1115 to position 1110 is integrated by finding an intersection point 1116 of the back projected rays 1117, 1118. Here, two estimates are combined to recover 3D information about light.

FIG. 9 depicts an embodiment related to steps 1307-1309, as described above.

The at least one second light according to the non-face region can also be already incorporated into the light estimation step of the first light from the face region. See for example FIG. 9, where light from direction 917 is captured in the non-face region 906 corresponding to the moon 921. This already captured light can be given as additional input to the light estimation step based on the face region 905.

Step 1310 provides a second image of at least part of the real environment captured by a second camera having a known spatial relationship with the first camera. For example, as shown in FIG. 7, the second camera could be the camera 709, while the first camera could be the camera 705. In this embodiment, both cameras are attached to a mobile device (e.g., a tablet computer or a smartphone) having a display screen 702 and have a fixed and known spatial relationship to each other. The second camera may capture an image 711 (i.e. the second image) of the table 708 (i.e. the at least part of the real environment).

Step 1311 determines at least one third light according to the second image. Light reflected from the at least part of the real environment and captured in the second image may be determined as at least part of the at least one third light. For example, light reflected from the table 708 and captured in the image 711 may be determined as at least part of the at least one third light. Light directly emitted from one or more radiant objects (e.g. sun, lamp, etc.) could also be determined as at least part of the at least one third light, for which the same embodiment of step 1307 may be applied.

Step 1312 integrates at least part of the at least one third light into the at least one first light according to the spatial relationship (similarly as step 1309).

Step 1314 provides a third image of the face captured by the first camera. Step 1315 determines at least one fourth light according to the third image. The at least one fourth light may be determined similarly as in one of the embodiments of determining the at least one first light. Step 1316 determines a first pose and a third pose of the first camera relative to the face when the first camera captures the first image and the third image, respectively.

Step 1317 determines a motion of the first camera between captures of the first and third images in a coordinate system of the real environment. The motion of the first camera may be determined according to a tracking system, e.g. using one or more of a GPS, inertial sensor, a camera etc. For example, the second camera may be fixed to the first camera and captures images of the real environment. A motion of the second camera may be determined according to the images of the real environment. The determined motion of the second camera can be used to determine the motion of the first camera between captures of the first and third images in a coordinate system of the real environment.

The motion of the first camera may be determined according to the first and the third images. Particularly, the first and third images may capture at least part of the real environment, and thus the motion may be estimated according to the captured at least part of the real environment in the first image and the third image.

Step 1318 integrates at least part of the at least one fourth light into the at least one first light according to the motion, the first pose and the third pose (similarly as step 1309).

FIGS. 10 and 11 depict a respective example related to steps 1314-1318 as described above.

According to aspects of the invention, the illumination can for example be estimated from the image of the face by inverse lighting and taking into account (combinations of) different effects of light on surface appearance like diffuse shading, specular and glossy reflections on skin and eye, interreflections between different parts of the face, subsurface scattering and cast shadows. The illumination can, for example, be estimated and represented in terms of spherical harmonics coefficients for low frequency lighting, wavelet basis for high frequency lighting, dominant directional and point light sources for localized lights or other representations like area light sources, mixtures of von Mises-Fisher Distributions or reconstructed environment maps.

A rendering with consistent illumination of the mixed scene containing real and virtual content can be done using the method of differential rendering proposed in P. Debevec, "Rendering synthetic objects into real scenes: bridging traditional and image-based graphics with global illumination and high dynamic range photography," In Proceedings of the 25$^{th}$ annual conference on Computer graphics and interactive techniques, SIGGRAPH '98, pages 189-198, New York, N.Y., USA, 1998, ACM ("Debevece") together with an appropriate method for calculating the two approximate global illumination solutions using, for example, shadow mapping, instant radiosity (see, e.g., Knecht, Martin, et al., "Differential instant radiosity for mixed reality," 9th IEEE International Symposium on Mixed and Augmented Reality (ISMAR), 2010), raytracing, photon mapping (see, e.g., Kan, Peter, and Hannes Kaufmann, "High-quality reflections, refractions, and caustics in augmented reality and their contribution to visual coherence," IEEE International Symposium on Mixed and Augmented Reality (ISMAR), 2012), reflective shadow maps, photon splatting, spherical harmonics lighting, precomputed radiance transfer, etc.

A possible embodiment of the invention comprises a combination with a user facing depth camera, which enables an estimation of illumination from the appearance of the face of the user to rely on more accurate information about the actual face model geometry. This allows extracting more details and elevates the need to either rely on statistics from basic standard face models or to fit and warp some generic face model. Another benefit of a depth camera is face detection and pose estimation within very dark or very bright (or strongly changing) scenarios, where standard low dynamic range cameras will most probably fail to detect the face and estimate the pose.

Another possible embodiment of the invention comprises the use of a video sequence. On the one hand, a dynamically changing illumination situation can be supported. That means when the illumination is changing during runtime of the video sequence, the new illumination situation can be estimated (because it is no separate pre-process and the face of the user is always visible). On the other hand, in case of non-changing lighting conditions, information from multiple frames (image data sets) can be integrated for a better estimate. The face may be tracked over time under different head poses. Assuming the same illumination over a period of time, the information about the illumination from multiple frames, where shadows and shading are changing when the head pose is varied, may be combined to capture more details (with or without depth camera). Observing multiple frames allows more robust estimation, distinguishing between specular/glossy and diffuse parts of reflection and recovering of higher frequencies of the illumination.

Different Types of Movements could be Distinguished as Follows:

For two types of movements, the user has a fixed pose with respect to a user facing camera. A first type is a rotation around the up-axis of the user, which allows a more complete (in terms of accounted light directions) estimation of the lighting conditions around the user, by integrating the multiple measurements into one robust directional light estimation (see, e.g., FIG. 10). From an image of the face, a certain coverage (in terms of directions) of the light incident on the face can be estimated. By taking multiple images with rotated setup and thereby taking multiple measurements of the light, a more complete coverage (in terms of directions) of the light incident on the face may be estimated by combining the different estimations (see examples in FIG. 10). Additionally, to get a more complete coverage, multiple estimations for a direction can be combined (for example by averaging the intensity estimated per direction over the different estimations) leading to a more robust estimation.

A second type of movement is a translation of the user together with a user facing camera. The directional lighting conditions are estimated at two different locations. From the two measurements, the third dimension of the light sources can be extracted by intersecting the rays from the origin of the estimation into the direction of the light sources (see, e.g., FIGS. 11 and 12).

A third type of movement is the movement of the face in front of a user facing camera. Different head poses give multiple measurements of the same illumination and can thereby lead to a more robust estimation. For example, the shadow cast by the nose is moving between different head poses.

The different types of movement can also be used in combination.

To incorporate multiple frames, the head pose should be tracked in relation to a real environment coordinate system associated with the real environment to distinguish between movements of the user facing camera and movements of the head. This can either be achieved in a two-camera set-up by the back facing camera tracking the fix world coordinate system or by the following embodiment.

A possible embodiment of the invention is considering the orientation and/or movement from tilt/gyroscope sensors and/or compass when tracking a user face alone in order to integrate information from multiple images into one light estimation.

Example

When the user is facing the mobile device (e.g., smartphone) and thereby moves or tilts the camera around, the movement of the head and the movement of the camera should be distinguished in order to integrate multiple measurements into a common "world coordinate system" and using them together to estimate the illumination.

A possible embodiment of the invention comprises a use of additional active light (photo light/flash or may be light from a screen) to artificially illuminate the face of the user in order to overcome limitations in albedo estimation. The image intensity/color does not only depend on the amount of light falling on the face, but also on the skin color/reflectance properties of the particular skin. By taking an image with added synthetic photo light and one without, the difference between the two images is the face just illuminated by the synthetic light. If we know intensity/light color of this light, we can deduct information about the surface reflectance like albedo.

A possible embodiment of the invention comprises a combination with a user facing thermal infrared camera which can help to detect face and estimate pose in front of a camera (such as, for dark or overexposed (or strongly changing) scenarios). The image of a thermal infrared camera could also be used to distinguish between areas of skin and areas of hair in order to reject areas containing hair as they harm the assumption of skin albedo, and skin regions are therefore preferred for light estimation.

A possible embodiment of the invention comprises a combination of a user facing color camera with a polarizer, so that diffuse and specular components of surface reflection can be separated, which allows a better estimation of the illumination.

A possible embodiment of the invention comprises an access of raw image data for the user facing camera to be able to work with linear intensities. In order to estimate the intensity of light from reflections, the observations should be in linear form, which is linearity between light intensity and image brightness. Different factors transform light intensity into non-linear form, like camera response curve, tone mapping, gamma transformation.

A possible embodiment of the invention comprises a use of a high-dynamic range imaging device for the user facing camera to be able to capture a full dynamic range of intensities as well as representing intensities in linear form. The low dynamic image has over and under exposed areas, where linearity between light intensity and image brightness is no longer given.

A possible embodiment of the invention comprises a use of an ambient light sensor to get an absolute scale for intensities of the colors of illumination.

Combination with a User Facing Fish Eye Camera:

A possible embodiment of the invention comprises a use of a wide angle (fisheye) lens for a user facing camera (see, e.g. FIG. 9). When estimating illumination from the appearance of the face of the user, there are less clues about the light coming from directions behind the user, as this light has only weak influence on appearance of face and therefore is hard to estimate. When the user-facing camera has a wide field of view it can also be used to directly capture illumination coming from behind the user. The part of the image showing the face of the user can be used to estimate light primarily coming from the front of the user, while the part of the image showing the background can be used as light capture for these specific directions. By combining information from both sources, one can recover a more complete, more robust estimation of illumination.

Combination of Illumination Estimation from a User Facing Camera and Aback Facing Camera:

A possible embodiment of the invention comprises a combination of a user facing image showing the face of the user and a back facing camera image showing the real scene, and using both (RGB or RGB-D) images in combination for estimating the illumination from the captured images.

A video image of one camera only contains surface orientations facing the camera. So, roughly half of the variation in surface orientations—those facing away from the camera—are not visible in the video image. As a consequence, only parts of the illumination can be estimated from light effects that depend on surface orientation like shading or reflections. Using a back facing camera on the scene together with a front facing camera facing the face of the user captures a bigger range of surface variations/ orientations in the images. Combining the information from the two video images from a front and back facing camera for light estimation allows getting more robust and complete estimations about the light directions. Additionally, it moderates the distant scene assumption for light sources estimated within both camera images by not only estimating (2D) directional information about the light sources, but (3D) positional information by combining directional light estimations from different parts of the scene via triangulation.

Consideration of Type of Illumination (Indoor/Outdoor) as Different Types of Light Sources to Estimate:

A possible embodiment of the invention comprises considering a type of illumination (as an example, distinguish indoor and outdoor) for using different algorithms and types of light source representations to estimate the illumination. Outdoor daylight illumination, for example, can be modelled as a smooth hemispherical area light source for the skylight plus a strong "more or less" directional light source for the sun and benefits from a different estimation procedure and light source representation than estimating indoor light comprising a window front or localized artificial light sources.

Different parameters/light source representations should be estimated and different algorithms should be used for the estimation (for example cast shadow vs. shading).

Either the representation and algorithm can be specified by use case or one can try to deduct which light type/environment is appropriate from detected features in a captured image, or by using, for example, a first estimate of the illumination, the light temperature from the ambient light sensor or the GPS reception strength. No GPS reception may be a hint for indoor. Ambient light sensors measuring the light temperature may be used to get an idea of the type of light source, with artificial light ranging approximately between 1700K (Kelvin) to 4800K, natural daylight from the sun and sky (except for sunrise and sunset) ranging between 4300K to 30000K. Thus indoor (or artificial light) and outdoor (natural light) may be distinguished according to temperature of light. Also a visible sky in the camera image can be used to determine that the scene is located outdoor. Further, cast shadow from the nose onto the face may indicate a strong directional light, which may be a sun. The color of the shadow region in comparison to the color of the lit region next to the shadow region can be used to deduct the color of the occluded light source. This color can be used as a hint for the type of light source (for example if the color suits to sun light).

Consideration of Light Spread/Shadow Cast Introduced by the Measuring Device (e.g. the Smartphone):

A possible embodiment of the invention can consider light introduced by the capturing device and/or mobile device (for example smartphone screen) as well as the shadow cast by the capturing device and/or mobile device in the captured image (or also, in general, in the scene). In general, the device used for capturing and displaying may affect the illumination in the scene. The effect could be considered and tried to be either removed from the light estimation or modelled explicitly.

Light Estimation Based on Training Images of Faces:

An approach according to an embodiment of the invention may be based on a supervised machine learning approach. We may use a plurality of training images of one or more faces captured by one or more cameras under known one or more different illuminations (i.e. one or more face incident lights are known) to learn or generate one or more radiance transfer functions (explained below) for one or more different sample positions (i.e. face sample positions) on a face, for example, in an offline training process. Each of the one or more different sample positions is associated with a radiance transfer function. The one or more different sample positions may be pre-defined in a coordinate system associated with the face manually and/or automatically according to at least one of human face specific characteristics.

A radiance transfer function for one face sample position describes a relationship between an output of a radiance ratio associated with the face sample position and inputs of light direction parameters. The radiance ratio is defined as between radiance (e.g. intensity) of a reflected light at the face sample position and radiance (e.g. intensity) of an incoming light from environment. The light parameters contain the direction of an incoming light. The light parameters may further contain the direction of a reflect light at the face sample position. When the pose of the face in the image is known, the direction of a reflect light at the face sample position may not be contained in the radiance transfer function.

Face incident light could be modelled as spherical harmonics—orthonormal basis functions over the domain of the surface of the unit-sphere, and be specified by a vector containing the corresponding coefficients of the spherical harmonics basis functions. Each of the one or more radiance transfer functions can be specified a vector containing the corresponding coefficients of the spherical harmonics basis functions.

For one face sample position, the reflected light intensity (encoded in pixel intensity at image position of the face sample position) in one image (any training image or any unseen image) may be defined as the integral over the product of the associated radiance transfer function and the face incident light related to the image. This integral becomes a simple dot product of the coefficient vectors representing each function. In the training images, the reflected light intensities and the face incident lights are known, and thus the radiance transfer function for the face sample position could be estimated. Each image would provide an equation for the radiance transfer function. The radiance transfer function may be estimated by solving an equation system.

For any new previously unseen image of a face (the unseen image is not included in the plurality of training images, e.g. an input image for environment light estimation based on the face region), we may first perform a face pose detection on the input image to determine in the input image of the face at least part of the one or more sample positions that are defined in the training stage.

The intensities of the at least part of the one or more sample positions in the input image could be used to determine environment light (i.e. face incident light) according to the radiance transfer functions associated with the at least part of the one or more sample positions. The radiance transfer functions are estimated in the training process.

A face does not emit (visible) light, but reflects light incident on the face. Light is assumed to be originating from an environment which is distant in comparison to the dimensions of the local object (e.g. the face). Therefore, the parallax effect regarding incident light from the distant environment can be neglected for the range of locations in the local scene, and the light coming from the environment can be defined depending on direction only.

A radiance transfer function in here specifies how a particular surface point of a face responds to incident light from the environment from a particular direction in terms of radiance reflected at this point towards the camera. The radiance transfer function depends mainly on the surface orientation at the location and occlusions of parts of the distant environment at the surface location by local geometry, but also includes material properties and interreflections of light between local geometry. After compensating for a per person albedo factor, we assume that for a particular position in the face the same radiance transfer function can be used over all different persons. The particular position in the face is specified within a coordinate system defined, for example, by the eye positions in the image. For now we restrict ourselves to frontal head poses.

For a particular face sample position on the face, the radiance transfer function has a fixed outgoing reflection direction and only has one variable for 2D parameter for the direction of incident light from the environment. It models the ratio of reflected light intensity to light intensity coming from the environment from a particular direction.

Most often a real environment does not only comprise a single direction where light is coming from, but a whole dense distribution of light intensities over the range of all directions. The combined reflected light resulting from multiple incident light directions is the sum over the reflected light intensities for each incident light direction. For the continuous range of directions the sum becomes an integral over the reflected light for incident light from all directions (also specified as the unit sphere). The integrand is the product of the radiance transfer function and the incoming light intensity from the particular direction.

An embodiment for estimation of the distant illumination comprises an offline learning stage and a real-time light estimation. In the learning stage we use a set of images of faces under different known directional illumination (Yale Face Database B+The Extended Yale Face Database B, see Athinodoros). From an image of a face under illumination we extract pixel intensities at the sample positions (which encode the reflected light at the corresponding surface positions towards the camera), which are samples of the integral of the product of the radiance transfer function at this particular point and the distant illumination. We model the radiance transfer function as well as the incident light from the distant environment using spherical harmonics—orthonormal basis functions over the domain of the surface of the unit-sphere. A particular radiance transfer function and a particular distant illumination can then be specified by the corresponding coefficients of the spherical harmonics basis functions. The integral over the product of radiance transfer function and a particular distant illumination becomes a simple dot product of the coefficient vectors representing each function.

Considering a particular surface point in the image, from every image we get an equation between the unknown radiance transfer function of the position in the face and the known pixel intensity and corresponding known illuminations. From the set of images and the thus captured samples (pixel intensities) we can build a system of equations and can calculate the least squares solution for the coefficients of the radiance transfer function. The offline stage results in recovered radiance transfer functions (each specified in spherical harmonics coefficients) for several positions in the face.

In the online stage we receive an image of a face as input and want to estimate the unknown illumination. By performing a face detection we first determine the coordinate system and thereby the sample positions in the image. Based on the recovered radiance transfer functions for the positions in the face we can then estimate the illumination in terms of Spherical Harmonics Coefficients as result of another least squares minimization over the system of equations of the different sample positions between unknown distant illumination and the known pixel intensities and corresponding known radiance transfer functions.

Radiance (i.e. light intensity) from the scene may be projected onto the image/sensor plane of the camera resulting in image irradiance incident on the sensor. The camera response function of the particular camera electronics determines how image irradiance is mapped to measured pixel intensity values.

Radiometric calibration can determine the inverse mapping from pixel intensity to image irradiance, so that pixel intensities can be again given a physical meaning regarding to the intensity of incident light. This is a pre-processing step for many algorithms calculating with intensities of light.

Further, the following aspects and embodiments may be applied in connection with the aspects and embodiments of the present invention as described above.

Real Object and Environment:

A real environment (or real world) may be an indoor scene or an outdoor scene. For example, the real environment may be an indoor office or an outdoor street. The real environment may also be or include a real object, such as a sofa, a car, a human, a face of a human, a tree, and/or a building. The at least part of the real environment could be a part of the real environment and/or at least one real object located in the real environment. The real environment or real object is visually perceivable information to anatomical eyes or optical imaging devices. For example, the real environment or real object may emit or reflect visible light that could be captured by human eyes or cameras. The real environment or real object may also emit or reflect invisible light that could not be captured by human eyes, but could be captured by a camera. For example, the real environment or real object may be an infrared figure and can be captured by an infrared camera.

Virtual Object:

A virtual object is any computer generated visually perceivable information to anatomical eyes or optical imaging devices. The virtual object can be displayed on a display device. The virtual object may be, for example, a text, figure, image, an object generated by computers or captured by a camera, symbols drawing, or their combinations.

Camera:

The present invention can be applied and implemented with any camera providing images. It is not restricted to cameras providing color images in the RGB format. It can also be applied to any other color format and also to monochrome images, for example, to cameras providing images in grayscale format or YUV format. A camera as used herein may further provide an image with depth data. The depth data does not need to be provided in the same resolution as the (color/grayscale) image. A camera providing an image with depth data is often called depth camera. A depth camera system could be a time of flight (TOF) camera system or a passive stereo camera or an active stereo camera based on structured light. The present invention may also use a light field camera that could capture an image from multiple different viewpoints and optionally with different focuses for the different viewpoints.

A camera as disclosed herein is an apparatus measuring the intensity of light and converting the measurements into a digital representation referred to as an image. By capturing an image, the camera takes measurements of quantity of radiation at a particular range of locations from a particular range of directions over a particular range of time. A mapping from the captured range of locations and directions to a particular part of the digital representation is determined by the extrinsic and intrinsic parameters of the camera. For a standard camera model with a simplified pinhole or fisheye camera model, only light falling through a single point, i.e. the pinhole, is measured. The captured range in the image can therefore be specified by two dimensions corresponding to the orientation of the incident light. Hence there exists a continuous mapping from the "pixel" position within a 2D array representation of the image to the orientation of incident light. Light field cameras are not limited to capturing only light falling through a single point, but measure also a plurality of light intensities incident at different locations. The captured range in an image thus can no longer be specified by a continuous mapping in two dimensions. In this disclosure, the term camera can refer to any digital camera as described above.

A camera may also be simulated by a virtual camera. A virtual camera is defined by a set of parameters and can create images of virtual objects or scenes, which are synthetic images. A crucial parameter of a virtual camera may be its pose, i.e. 3D translation and 3D orientation with respect to the virtual object or scene. Virtual cameras may map an object in 3D space onto a 2D space. For example, a virtual camera could map a 3D object onto a 2D image plane. The mapping of the virtual camera may be the pinhole camera model, and in this case the camera's intrinsic parameters include the focal length and the principal point. Virtual cameras may also use the fisheye camera model or simulate arbitrary optics. Common implementations of virtual cameras use the OpenGL rasterization pipeline, ray casting or ray tracing. Generally, virtual cameras create views (i.e. two-dimensional images) of (potentially 3D) virtual objects by approximations of the capturing process happening when a real camera images a real object. In Augmented Reality, the intrinsic and extrinsic parameters of a camera are usually chosen to be consistent either with a real camera or such that they correspond to a setup of an Augmented Reality system.

A camera typically has an optical axis and an image plane, whereby an image of a scene being addressed by the computer vision system is formed in the image plane when the optical axis is pointed into the direction of the real environment. The direction of the optical axis is pointing into the real environment. Typically, the optical axis is perpendicular to the image plane.

Image:

An image is any data depicting or recording visual information or perception. An image could be a 2-dimensional image. An image could also be a depth image. An image could be a real image or a synthetic image. A real image may be captured by a camera. For example, a RGB camera could capture an object of interest or a part of the object of interest in one real RGB image. A synthetic image may be generated automatically by a computer or manually by a human. For example, a computer rendering program (e.g. based on openGL) may generate a synthetic image of an object of interest or a part of the object of interest. A synthetic image may be generated from a perspective projection as it is captured by a camera. A synthetic image may be generated according to orthogonal projection.

A depth image is a 2D image with a corresponding depth map. Depth images do not need to be provided in the same resolution as any 2D (color/grayscale) image. The depth image may also be called 3D image. A plurality of images of human faces may be captured by using one or more real cameras to capture one or more real faces. A plurality of images of human faces may also be generated by rendering one or more 3D models of faces in a computer.

In this disclosure, it is described that one or more images may be provided or received. For example, an image may be captured by a camera and provided to a processing system, e.g. comprised in a mobile device (such as a smartphone or tablet computer) and/or in a server computer. When an image is provided or received, it shall be understood herein that corresponding image information (or data) associated with the image is provided or received, e.g. in wired manner or wirelessly. It is known to the skilled person that this may include providing or receiving any processed or non-processed information (data) of an image, part of an image and/or features of an image which allows for feature recognition and/or pose estimation. The invention does not require providing or receiving any raw image data. Processing thereby includes, for example, compression, encryption, conversion to another color space or grayscale, etc. All such image processing methods can optionally be performed and shall be included by the terminology of image information or data of an image.

Light:

Light may be one or more electromagnetic radiations, which could be measured, for example, by photocells or charge-coupled devices (CCD) as well as, for example, by special cells in the retina of the human eye. Light is a basic input for visual perception of the environment. Light may be visible or invisible to a human eye. For example, infrared light is invisible to a human eye.

Primary properties of light are frequency/wavelength (which corresponds to color with visible light lying in the range around 400 nanometers to 700 nanometers, and invisible light like infrared or ultraviolet lying below or above the visible spectrum), propagation direction and intensity. Light is an electromagnetic radiation and propagates through space as radiant energy. The amount of light faring along a ray can be measured as radiance. Light that may be emitted by radiant objects (e.g. sun, bulb, etc.) in the real environment or reflected or refracted at surfaces of at least part of the real environment (e.g., face, wall, sky, moon) is also called environment light. Any radiant objects and surfaces of at least part of the real environment may be considered as light sources.

In the present disclosure, a light (e.g. the at least one first light, the at least one second light, the at least one third light, and/or the at least one fourth light) may represent one or more light rays. Each of the one or more light rays may have a direction, intensity and/or color (wavelength). A light ray may be a combination of one or more electromagnetic radiations emitted or reflected from different light sources. A light distribution within space can be described as a light field, which is a function determining the amount of light faring in multiple directions through multiple points in space. A full spectrum of wavelengths can be approximated for human vision considering only three principal colors red, green and blue corresponding to the three different types of cones in the photoreceptor layer of the human eye responsible for color perception. When excluding fluorescence, radiation does neither change wavelength at surface interactions. Then, for a color image and inverse rendering, each color channel can be regarded separately like a grayscale image for estimating the intensity of the light of this particular wavelength. For a particular wavelength, the 5D plenoptic function returns radiance along a ray defined in 3D location and 2D orientation.

Inverse rendering estimates an incident light (e.g. including one or more light rays) falling on an object according to an image of the object and knowledge about the corresponding surface model of the object. Thereby most often the incident light is considered coming from a distant environment. This means that the light sources are considered to be located far from the local lit and displayed scene part, so that the parallax effect regarding incident light can be neglected for locations within this considered range of the local scene. The light incident from the distant scene then only depends on direction and not on position. This 2D function (one function per wavelength) of incident light from the distant scene only depending on direction is herein referred to as directional distribution of incident light. A common approach in inverse rendering is to find the most plausible and likely directional distribution of incident light for a given image. Note that the effective amount of light falling onto a surface is still affected by occlusions and interreflections within the local scene. Light incident from the distant environment can still be occluded for a surface point of the local object by another part of the local object or reflected from a local surface point of the local object onto another one. Depending on the particular implementation of inverse rendering, these interreflection and shadowing effects are considered or not.

A model of incident light can, for example, be ambient light only (one scalar value (per wavelength)), one directional light (2D direction), one directional light (2D direction+intensity per wavelength) or a function returning the amount of incident light from each direction (environment map, spherical harmonics representation, wavelets). Depending on the used model of incident light, an estimation of the directional distribution can range from simple estimating a scalar value, i.e. an average radiance over all directions, to estimating a primary direction (=two values/angles) from which most of the light intensity is coming, to finally a continuous estimation of radiance (~ intensities) over the whole range of possible directions and a lot of other variations in between.

Depending on the available calibrations of the capturing tool chain and knowledge about the material properties of the captured objects (e.g. face specific characteristics of a human face), estimations can either be absolute values of radiance or relative values. Relative intensity can, for example, be relative to a reference value for one particular direction (e.g., there is double the amount of light coming from left than from above) or relative to a reference value for one particular wavelength (e.g., there is double the amount of incident red light than incident blue light). Additionally a separate estimation for multiple wavelengths (or red, green, blue) is possible. The scaling between the different estimations can only be determined by additional knowledge, for example information about material properties of the captured objects.

Light estimation from images may benefit from a radiometric calibration of the capturing tool chain and the camera that captures the images. Radiometric calibration is needed in order to estimate absolute values of the light. Otherwise estimations are influenced or distorted by Camera parameters (camera response curve, exposure, white balance, contrast, colour intensity, tone mapping, etc.). Note, that this can also be wanted, because it automatically incorporates the camera effects in the estimated environment light, so that the virtual objects appear consistent with camera image, e.g. also overexposed like the camera image.

Light Source Representation:

Depending on light characteristics, different light source representations can be used. Color of light corresponds to intensities per wavelength and thereby can be represented by one or more scalar values for intensity per wavelength (e.g one for red, one for green, one for blue). Ambient light, which typically specifies a constant intensity of light within the whole scene, can be represented by one or more scalar values per wavelength (e.g 3 values, one for red, one for green, one for blue). A directional light source can be represented by a 2D vector for the two angles for the direction (most often the direction is also represented by a 3D unit vector). For also representing the intensity for this directional light source, the representation can be extended by a scalar value per wavelength.

An unlocalized area light source corresponds to a continuous range of directional light sources. The range of directions can be defined by either a spherical geometry definition (2D Mesh), mean direction and extend, intervals of angles or some discretization over the domain of unit directions (e.g. 2D image).

A directional light source with varying intensities over the full spectrum of directions (defined over the unit sphere) can be represented by a scalar valued function per wavelength mapping from the domain of the unit sphere to the intensity of light from this direction. These functions can for example be specified using spherical harmonics (and coefficients), wavelets over the sphere (and coefficients), mixtures of von Mises-Fisher distributions (number of modes, mean direction and concentration parameters) or discrete 2D image representations with a mapping to the unit sphere like for example environment maps.

A point light source can be represented by a 3D vector corresponding to the position. A point light source typically emits light equally into all directions. Thus, for also representing the intensity for this point light source, the representation can be extended by a scalar value per wavelength.

A spot light source can be represented by a 3D vector corresponding to the origin, a direction (2D or 3D unit vector) corresponding to the primary light direction—the axis of the cone of light directions—and the opening angle of the cone. Additional parameters specifying the radiation behaviour related to direction can be added (for example linear fall off of intensities from primary light direction to direction at opening angle).

A localized area light source can be defined by a 3D geometry within the scene (triangle mesh, generic object definition (like sphere) or some other surface representation like for example NURBS) and additional parameters specifying the radiation behaviour related to direction.

Point light sources, spot light sources and localized area light sources are local light sources, meaning that the effective intensity of the light source depends on the location of the light source as well as the location of the surface point. The intensity onto a surface point depends on distance. The direction under which a light source is visible to a surface point also depends on the location of the surface point.

In general any localized light source can be represented by a set of locations in 3D specifying the origins of light emission each with an associated radiation behaviour in terms of intensity related to direction (analog to a directional light source with varying intensities over the full spectrum of directions)

Light intensity can be specified in absolute values of, for example, radiance, or in relative values. Relative intensity can, for example, be relative to a reference value for a particular direction (e.g., there is double the amount of light coming from left than from above) or relative to a reference value for a particular wavelength (e.g., there is double the amount of red light than blue light).

Human Face and Human Face Specific Characteristics:

Human face specific characteristics as disclosed herein may comprise, but are not limited to, at least one of a generic 3D face model, a geometry of at least part of a face, a material property of at least part of a face, a color of at least part of a face, a radiance transfer property of at least part of a face and a reflection property of at least part of a face.

The amount of light reflected at a particular area of an object towards the camera appears as intensity of a pixel in the image. This amount depends on the light originally emitted by light sources as well as on how light is distributed by objects in the scene. The manner according to which light is distributed depends on different factors, like surface orientations and material properties as well as on occlusions of light paths by geometry.

Inverse lighting—that is light estimation from images—often relies on known geometry and material properties of the visible objects. From a variety of measurements of light intensity (an image)—together with known underlying geometry (and thereby known surface orientations and occlusions) and material properties—a most probable version of incident illumination causing the measured reflected intensity may be determined. The more multi-faceted the underlying geometry is, the more features of the illumination can be recovered. For arbitrary scenes, geometry as well as material can be arbitrarily inappropriate. An example for inappropriate geometry, for example, is a simple plane, where there is no variation in surface orientation.

Face geometry on the other side is appropriate for light estimation covering nearly a full dense range of the potentially visible hemisphere of surface orientations, as well as containing distinct regions like the nose leading to variations in occlusions of incident light directions. The face geometry may be obtained from a generic 3D face model.

For arbitrary unknown scenes, geometry as well as material may first be determined. While geometry can be determined nowadays on the fly, it still often relies on special hardware like a depth or stereo camera. Face geometry on the other hand has a limited range of variation, so that predefined models can be used. These models can either be used directly or be further adapted to better fit based on the image (3D Morphable Models). So, in general no special hardware is needed to acquire the geometry of the face.

Additionally these models can already contain all necessary information for light estimation specific for faces like material properties or occlusions. In general, the whole light transfer (specifying how much of incident light from a particular direction is effectively reflected back towards the camera) could be already pre-calculated. For example, a set of images of a face under a wide variety of lighting conditions can be approximated by a low-dimensional linear subspace, for example by a linear combination of 9 basis images of the face under Spherical Harmonics Basis Lighting. These images can be pre-calculated and used to estimate optimal coefficients of the linear combination for a captured image of a face leading to an estimation of the Spherical Harmonics Representation of the lighting, like shown in Zhang.

Acquiring material properties on the fly under unknown light conditions is quite difficult and typically hardly possible from one image without any additional assumptions, for example because there is an ambiguity between light and material. An image showing a green sphere could for example be created using a green sphere with white light, or a white sphere with green light. Acquiring material properties on the fly is more difficult when the material properties vary a lot over the surface. Often a uniform material property is assumed which can be arbitrarily wrong for arbitrary objects.

For human faces the range of human face specific characteristics (e.g. material properties, color, surface orientation at a particular position, etc.) can be limited in advance. Therefore, instead of one element (like an average value of Albedo or a reflection function) for a face specific characteristic, a set of elements (e.g. a limited range or subspace) for a face specific characteristic could be modelled, and the corresponding elements for a particular face could be optimized for within/combined with the light estimation. For example a set of "Albedo" or "reflectance functions" can be predefined (manually or automatically extracted). From a set of predefined different elements of a face specific characteristic, the best fitting element can be picked (automatically or manually selected).

Face regions of a particular face, that do not fit to the model, e.g. macula, tattoo, beard, hair, geometric deviations can be detected as an inconsistency and excluded from the light estimation.

For determining the environment light using an image of a particular face, at least part of the face region may be excluded from the estimation based on inconsistency within properties of the particular part of the face region. Inconsistencies can be either detected based on properties modelled for a particular face region (for example no harsh contrasts) or based on how well a particular part of the face region fits to an estimated environment light. For example parts from the image of a face which do not meet the assumption of skin color (e.g. because of macula, tattoo, beard, hair) can be detected and not used for the light estimation. The consistency between different features can be checked, and outliers removed from the estimation.

Additionally regions of uniform material properties can be identified in advance (pre-learned) and regions inappropriate for estimating illumination (for example eyebrows) can be excluded. Also the fact that skin color contains all of the three primary chromaticities (red, green and blue) of the RGB color space (which is equivalent to that it reflects all of three primary chromaticities of incident light) makes it well suited for estimating light (including color).

A green sphere in contrast would, for example, only reflect the green part of light, so that red light would not be reflected at all. Such problem does not exist for human skin. However the different weights of reflection per wavelength vary between different skin colors. Different types of albedo can, for example, be estimated using a method proposed in Suh, Sungho, et al., "Robust Albedo Estimation From a Facial Image With Case Shadow Under General Unknown Lighting," IEEE Transactions on Image Processing, 22.1 (2013): 391-401. Skin does not perform as a fully diffuse material, but also contains some glossy reflections. Additional eyes exhibit specular reflections (see Nishino, Ko, et al., "Using eye reflections for face recognition under varying illumination," Tenth IEEE International Conference on Computer Vision (ICCV), Vol. 1, 2005). This and also shadow cast, for example, by the nose allows the recovering of higher frequencies in variations of incident light compared with, for example, a fully diffuse sphere.

Another benefit of human faces is a well understood and stable tracking of faces and head pose estimation. With a face being a moving part within a mainly static scene, the motion between the scene and the face should be separated in order to combine multiple measurements and light estimations together. With the face of user being in front of the user facing camera—even when the user is moving through a scene—the additional effort of an extra geometry moving with the user for the light estimation is nullified. Compared with estimating from arbitrary visible geometry, which changes over the time while the user is moving, the face provides the possibility for being available and being well suited over the whole process of augmentation.

Whenever it is referred herein to a "face" or any parts or regions of a face, it should be understood that this shall refer to a human face, particularly a user's face, and any regions or parts thereof, respectively.

Model:

A model may describe a geometry of an object or a generic geometry of a group of objects. A 2D model of an object may describe 2D geometry of at least part of the object. A 3D model of an object may describe 3D geometry of at least part of the object. The object may be a real object or a virtual object. A generic 2D or 3D model may describe generic 2D or 3D geometry of a group of objects. For example, a 3D model may be specific for an object. A 3D model may not be specific for an object, but may describe a generic geometry for a group of similar objects. The similar objects may belong to a same type and share some common properties. For example, faces of different people are belonging to a same type having eye, mouth, ear, nose, etc. Cars of different models or from different brands are belonging to a same object type having four tires, at least two doors, and a front window glass, etc.

A generic 3D face model may not be the same as any real existing individual face, but it may be similar to an existing individual face. For example, the silhouette of the face of the 3D model may not exactly match the silhouette of the existing individual face, but they are all the shape of eclipse. A generic 3D face model may be determined according to a plurality of 3D models of faces, like described in Blanz, V., et al., "A Morphable Model For The Synthesis of 3D Faces," SIGGRAPH '99: Proceedings of the 26th Annual Conference on Computer Graphics and Interactive Techniques, August 1999, pp. 187-194. The face model can also be already further processed, for example containing the principal component analysis with mean and variances for at least one of face specific characteristics.

Geometry refers to one or more attributes of the object including, but not limited to, shape, form, surface, symmetry, geometrical size, dimensions, and/or structure. A model of a real object or a virtual object could be represented by a CAD model, a polygon model, a point cloud, a volumetric dataset, and/or an edge model, or use any other representation. A model may further describe a material of the object. A material of the object could be represented by textures and/or colors in the model and could, for example, represent the reflection or radiance transfer properties of the model. A model of an object may use different representations for different parts of the object.

At least part of the geometry may be mathematically represented by at least one coordinate (discrete representation) or by at least one mathematic formula (continuous representation) in a 2D or 3D coordinate system. For example, a circle or a sphere may be represented by a set of points or by an equation in a 2D or 3D coordinate system. A circle that is a 2D shape may be defined in a 2D or 3D space. A sphere that is a 3D geometry may be defined in a 2D space as a projection of the sphere (i.e. 3D shape) onto the 2D space.

A 3D model can further, for example, be represented as a model comprising 3D vertices and polygonal faces and/or edges spanned by these vertices. Edges and faces of the model may also be represented as splines or NURBS surfaces. A 3D model may be accompanied by a bitmap file describing its texture and material where every vertex in the polygon model has a texture coordinate describing where in the bitmap texture the material for this vertex is stored. A 3D model can also be represented by a set of 3D points as, for example, captured with a laser scanner. The points might carry additional information on their color, intensity and/or any other additional information related to particular point.

Transformation and Pose:

A transformation describes a spatial relationship between two objects or between two coordinate systems, i.e. specifies how an object or a coordinate system is located in 2D or 3D space in relation to other object or other coordinate system in terms of translation, and/or rotation, and/or scale. The transformation may be a rigid transformation or could also be a similarity transformation. A rigid transformation includes translation and/or rotation. A spatial relationship between two objects describes a rigid transformation between the two objects. A pose of a camera or a pose of an object relative to a coordinate system or relative to another object is a rigid transformation. A motion of a camera describes a spatial relationship or a rigid transformation between the camera at one position and the camera at another position in a common coordinate system.

View of the Real Environment:

A view of the real environment or a part of the real environment may be captured by a camera or by an eye. For example, the view could be captured as visual impressions by user's eyes or acquired as one or more images by a camera worn by a user or attached on a device held by a user. A human eye and a camera have the same imaging mathematical model, i.e. pinhole projection model. The view at least represents 2D imagery information. A view defines a field of vision. There are different hardware setups which can be employed to enhance the view of a user onto a real object or environment by blending in spatially registered virtual objects in the view on a display device. Examples include setups for optical-see-through AR, video-see-through AR, and projective AR, as described more elaborately in the introduction.

Display Device (AR Setup):

There are different setups or devices to integrate at least one virtual object into the view of a real environment. One example is to place an optical-see-though device between the user's eye and the real object. The real object can then be directly observed through this semi-transparent screen of the optical-see-though device, while the virtual object is computer-generated and shown on the semi-transparent screen. This configuration is referred to as optical-see-through AR. In this case, the eye of the user will be a viewer, and the semi-transparent screen is a display device.

The visual integration of a virtual object and a real object (or environment) can also be performed using a video-see-though device which comprises a camera and a reflective or emissive screen, e.g. LCD, LED, OLED, or E Ink. In this configuration the camera captures an image of the real object or environment and then displays the captured image overlaid with a spatially registered computer-generated virtual object on the display device. This configuration is referred to as video-see-through AR. In this case, the camera will be a viewer, and the reflective or emissive screen is a display device.

Another approach is to use a visual light projector to project a computer-generated virtual object spatially registered onto a real object or real environment. The user then directly observes the real object and the projected virtual object without the need to look at or through any physical display. In this case of projective AR, the projector is a viewer, and at least part of projection surfaces (e.g. surfaces of the real object, on which the virtual object is projected) is a display device.

At least part of the display device may be planar (e.g. a display surface) and may have a normal direction associated with the planar part. Typically, the normal direction is perpendicular to the planar part. The normal direction typically points from the display device to a user who observes, in front of the display device, visual information displayed on the at least part of the display device.

Although various embodiments are described herein with reference to certain components, any other configuration of components, as described herein or evident to the skilled person, can also be used when implementing any of these embodiments. Any of the devices or components as described herein may be or may comprise a respective processing device (not explicitly shown), such as a microprocessor, for performing some or more of the tasks as described herein. One or more of the processing tasks may be processed by one or more of the components or their processing devices which are communicating with each other, e.g. by a respective point to point communication or via a network, e.g. via a server computer.

The invention claimed is:

1. A non-transitory computer readable medium comprising computer code executable by one or more processors to:
   obtain, by a depth camera, a first image of at least part of a face and depth information for the at least part of the face;
   determine a pose of the at least part of the face based on the depth information;
   determine intensity information at the at least part of the face;
   determine a first light source according to the intensity information, the pose of the at least part of the face and at least part of a 3D face model;
   render a virtual object for presentation with an illumination based on the determined first light source.

2. The non-transitory computer readable medium of claim 1, wherein the computer readable code to render the virtual object further comprises computer readable code to:
   capture an image of an environment by a second camera; and
   render the virtual object based on a spatial relationship between the depth camera and the second camera.

3. The non-transitory computer readable medium of claim 2, wherein the depth camera and the second camera are comprised on a device, further comprising computer readable code to:
   determine a motion of the device between capturing the first image of at least part of the face, and the image of the environment; and
   updating the determined first light source according to the motion.

4. The non-transitory computer readable medium of claim 3, wherein the motion is determined according to at least one consisting of a group consisting of an inertial sensor, GPS sensor, and compass.

5. The non-transitory computer readable medium of claim 3, wherein the depth camera has a known spatial relationship to the second camera.

6. The non-transitory computer readable medium of claim 1, wherein the computer readable code to determine the first light source further comprises computer readable code to:
   identify, based on the pose of the at least part of the face, a face sample position of a plurality of face sample positions each corresponding to intensity information; and
   determine the first light source according to the identified face sample position.

7. The non-transitory computer readable medium of claim 1, further comprising computer readable code to:
   determine at least part of a non-face image area as a background region,
   determine a second light source according to the background region in a way different from determining the first light source, and
   update the illumination of the virtual object based on the determined second light source.

8. A method, comprising:
   obtaining, by a depth camera, a first image of at least part of a face and depth information for the at least part of the face;
   determining a pose of the at least part of the face based on the depth information;
   determining intensity information at the at least part of the face;
   determining a first light source according to the intensity information, the pose of the at least part of the face, and at least part of a 3D face model; and
   rendering a virtual object for presentation with an illumination based on the determined first light source.

9. The method of claim 8, wherein rendering the virtual object further comprises:
   capturing an image of an environment by a second camera; and
   rendering the virtual object based on a spatial relationship between the depth camera and the second camera.

10. The method of claim 9, wherein the depth camera and the second camera are comprised on a device, the method further comprising:
    determining a motion of the device between capturing the first image of at least part of the face, and the image of the environment; and
    updating the determined first light source according to the motion.

11. The method of claim 10, wherein the motion is determined according to at least one consisting of a group consisting of an inertial sensor, GPS sensor, and compass.

12. The method of claim 11, wherein the depth camera has a known spatial relationship to the second camera.

13. The method of claim 8, wherein determining the first light source further comprises:
    identifying, based on the pose of the at least part of the face, a face sample position of a plurality of face sample positions each corresponding to intensity information; and
    determining the first light source according to the identified face sample position.

14. The method of claim 8, further comprising:
    determining at least part of a non-face image area as a background region,
    determining a second light source according to the background region in a way different from determining the first light source, and
    updating the illumination of the virtual object based on the determined second light source.

15. A system, comprising:
    one or more processors; and one or more non-transitory computer readable media comprising computer code executable by the one or more processors to:
  obtain, by a depth camera, a first image of at least part of a face and depth information for the at least part of the face;
  determine a pose of the at least part of the face based on the depth information;
  determine intensity information at the at least part of the face;
  determine a first light source according to the intensity information, the pose of the at least part of the face, and at least part of a 3D face model;
  render a virtual object for presentation with an illumination based on the determined first light source.

16. The system of claim 15, wherein the computer readable code to render the virtual object further comprises computer readable code to:
  capture an image of an environment by a second camera; and
  render the virtual object based on a spatial relationship between the depth camera and the second camera.

17. The system of claim 16, wherein the depth camera and the second camera are comprised on a device, further comprising computer readable code to:
  determine a motion of the device between capturing the first image of at least part of the face, and the image of the environment; and
  update the determined first light source according to the motion.

18. The system of claim 17, wherein the motion is determined according to at least one consisting of a group consisting of an inertial sensor, GPS sensor, and compass.

19. The system of claim 15, wherein the computer readable code to determine the first light source further comprises computer readable code to:
  identify, based on the pose of the at least part of the face, a face sample position of a plurality of face sample positions each corresponding to intensity information; and
  determine the first light source according to the identified face sample position.

20. The system of claim 15, further comprising computer readable code to:
  determine at least part of a non-face image area as a background region,
  determine a second light source according to the background region in a way different from determining the first light source, and
  update the illumination of the virtual object based on the determined second light source.

* * * * *